(12) United States Patent
Furuya et al.

(10) Patent No.: US 10,336,401 B2
(45) Date of Patent: Jul. 2, 2019

(54) BICYCLE CRANK ASSEMBLY

(71) Applicant: Shimano Inc., Sakai, Osaka (JP)

(72) Inventors: Takashi Furuya, Sakai (JP); Masahiro Yamanaka, Sakai (JP); Atsuhiro Emura, Sakai (JP)

(73) Assignee: SHIMANO INC., Osaka (JP)

(*) Notice: Subject to any disclaimer, the term of this patent is extended or adjusted under 35 U.S.C. 154(b) by 138 days.

(21) Appl. No.: 15/385,880

(22) Filed: Dec. 21, 2016

(65) Prior Publication Data
US 2018/0170478 A1    Jun. 21, 2018

(51) Int. Cl.
*B62M 3/00*   (2006.01)
*B62M 1/36*   (2013.01)
*F16D 1/068*  (2006.01)
*F16D 1/08*   (2006.01)
*B62M 9/00*   (2006.01)

(52) U.S. Cl.
CPC ............. *B62M 3/003* (2013.01); *B62M 1/36* (2013.01); *F16D 1/068* (2013.01); *F16D 1/08* (2013.01); *B62M 9/00* (2013.01)

(58) Field of Classification Search
CPC .. B62M 3/003; B62M 3/00; B62M 2003/006; B62M 1/36; B62K 19/34; Y10T 74/2164
See application file for complete search history.

(56) References Cited

U.S. PATENT DOCUMENTS

| | | | |
|---|---|---|---|
| 599,652 A * | 2/1898 | Ferris | B62K 19/34 384/458 |
| 4,358,967 A * | 11/1982 | Kastan | B62K 19/34 74/594.1 |
| 5,819,599 A * | 10/1998 | Yamanaka | B25B 13/48 74/594.1 |
| 6,415,684 B1 | 7/2002 | Yamanaka | |
| 7,650,817 B2 * | 1/2010 | Shiraishi | B62M 3/003 280/259 |
| 7,850,564 B2 | 12/2010 | Nonoshita | |
| 2007/0295157 A1 * | 12/2007 | Schroeder | B62M 3/003 74/594.2 |
| 2011/0140390 A1 * | 6/2011 | Kuroiwa | B62M 3/003 280/261 |

* cited by examiner

*Primary Examiner* — Richard W Ridley
*Assistant Examiner* — Brian J McGovern

(57) ABSTRACT

A bicycle crank assembly includes a fixing member for fixing a sprocket to a crank arm. The fixing member includes a radially-extending projection, to prevent the sprocket from moving relative to the crank axle in an axial direction, and an axially-extending base portion, which is secured to the crank arm. A contact part is provided on an inner periphery of the base portion and contacts the crank axle or is provided on the crank axle and contacts the base portion. The contact part permits force to be transmitted between the crank axle and the fixing member to limit flexing of the crank axle assembly.

40 Claims, 16 Drawing Sheets

BICYCLE CRANK ASSEMBLY

TECHNICAL FIELD

The present invention generally relates to a bicycle crank assembly. More specifically, the present invention relates to a bicycle crank assembly with a fixing member for securing a sprocket to the bicycle crank assembly.

BACKGROUND OF THE INVENTION

In a direct-mount type of bicycle crank assembly, a fixing member is sometimes used to secure a sprocket to a crank arm. In such assemblies, a radial gap may exist between adjacent parts.

SUMMARY OF THE INVENTION

In a first aspect of the invention, a bicycle crank assembly includes a crank arm including a crank-axle-mounting portion; a sprocket including a sprocket body and a plurality of sprocket teeth provided on an outer periphery of the sprocket body; a crank axle; and a fixing member including a base portion, a projection, and a first thread. The projection extends radially outwardly from an outer periphery of the base portion with respect to a rotational center axis of the bicycle crank assembly. The projection is configured to prevent the sprocket from moving relative to the crank axle in an axial direction parallel to the rotational center axis. The fixing member includes a contact part provided on an inner periphery of the base portion. The contact part is configured to contact the crank axle in a state where the first thread of the fixing member is engaged with a second thread provided on one of the crank arm and the crank axle.

With the bicycle crank assembly according to the first aspect, it is possible to provide a bicycle crank assembly having a high bending stiffness.

In a second aspect of the invention, in the bicycle crank assembly according to the first aspect, the base portion has an annular shape.

With the bicycle crank assembly according to the second aspect, it is possible to reduce a total number of parts of a bicycle crank assembly and to easily mount a fixing member to one of a crank arm and a crank axle.

In a third aspect of the invention, in the bicycle crank assembly according to the second aspect, the base portion has a tubular shape.

With the bicycle crank assembly according to the third aspect, it is possible to increase rigidity of a fixing member.

In a fourth aspect of the invention, in the bicycle crank assembly according to any one of the previous aspects, the second thread is provided on the crank arm.

With the bicycle crank assembly according to the fourth aspect, it is possible to simplify the structure of a crank axle.

In a fifth aspect of the invention, in the bicycle crank assembly according to the fourth aspect, the second thread is formed on the crank-axle mounting portion.

With the bicycle crank assembly according to the fifth aspect, it is possible to simplify the structure of a crank axle.

In a sixth aspect of the invention, in the bicycle crank assembly according to any one of the previous aspects, the base portion has a tubular shape, and the base portion is configured to be partly disposed between the crank-axle mounting portion of the crank arm and the crank axle in a radial direction with respect to the rotational center axis in a state where the first thread is engaged with the second thread.

With the bicycle crank assembly according to the sixth aspect, it is possible to provide a bicycle crank assembly having a high bending stiffness.

In a seventh aspect of the invention, in the bicycle crank assembly according to the sixth aspect, the first thread is provided on the outer periphery of the base portion, and the second thread is provided on the crank-axle mounting portion of the crank arm.

With the bicycle crank assembly according to the seventh aspect, it is possible to provide a bicycle crank assembly having a high bending stiffness.

In an eighth aspect of the invention, in the bicycle crank assembly according to any one of the previous aspects, the projection extends around the outer periphery of the base portion in a circumferential direction with respect to the rotational center axis.

With the bicycle crank assembly according to the eighth aspect, it is possible to effectively prevent a sprocket from moving in an axial direction parallel to a rotational center axis.

In a ninth aspect of the invention, in the bicycle crank assembly according to the eighth aspect, the projection extends completely around the outer periphery of the base portion in the circumferential direction with respect to the rotational center axis.

With the bicycle crank assembly according to the ninth aspect, it is possible to firmly prevent a sprocket from moving in an axial direction parallel to a rotational center axis.

In a tenth aspect of the invention, in the bicycle crank assembly according to any one of the previous aspects, the sprocket body has a first torque-transmitting profile, and the crank-axle-mounting portion has a second torque-transmitting profile that is configured to engage with the first torque-transmitting profile.

With the bicycle crank assembly according to the tenth aspect, it is possible to effectively transmit a torque between a sprocket and a crank arm.

In an eleventh aspect of the invention, in the bicycle crank assembly according to the tenth aspect, the first torque transmitting profile includes a plurality of inner splines, and the second torque transmitting profile includes a plurality of outer splines.

With the bicycle crank assembly according to the eleventh aspect, it is possible to effectively transmit a torque between a sprocket and a crank arm.

In a twelfth aspect of the invention, in the bicycle crank assembly according to any one of the previous aspects, the projection has a sprocket-facing surface on which knurling is formed.

With the bicycle crank assembly according to the twelfth aspect, it is possible to prevent a fixing member from being undesirably loosened.

In a thirteenth aspect of the invention, in the bicycle crank assembly according to the twelfth aspect, the sprocket body has a projection-facing surface on which knurling is formed.

With the bicycle crank assembly according to the thirteenth aspect, it is possible to prevent a fixing member from being undesirably loosened.

In a fourteenth aspect of the invention, the bicycle crank assembly according to any one of the previous aspects further includes a washer configured to be located between the sprocket body and the projection in the axial direction.

With the bicycle crank assembly according to the fourteenth aspect, it is possible to prevent knurling of a projection and a sprocket body from being damaged when the first thread and second thread are engaged with each other.

In a fifteenth aspect of the invention, the bicycle crank assembly according to any one of the previous aspects further includes a seal member configured to be located between the fixing member and the crank axle in a radial direction with respect to the rotational center axis.

With the bicycle crank assembly according to the fifteenth aspect, it is possible to prevent water, dust and so on from entering between a fixing member and a crank axle.

In a sixteenth aspect of the invention, in the bicycle crank assembly according to the fifteenth aspect, the seal member has a proximal end and a distal end, the distal end is fixed to the fixing member, and the proximal end contacts the crank axle.

With the bicycle crank assembly according to the sixteenth aspect, it is possible to prevent water, dust and so on from entering between a fixing member and a crank axle.

In a seventeenth aspect of the invention, the bicycle crank assembly according to any one of the previous aspects, the crank axle has a first end and a second end, the second end is opposite to the first end in the axial direction parallel to the rotational center axis of the bicycle crank assembly, and a plurality of first splines is provided on the first end, and a plurality of second splines is provided on the second end.

With the bicycle crank assembly according to the seventeenth aspect, it is possible to effectively transmit a torque between a crank arm and a crank axle.

In an eighteenth aspect of the invention, in the bicycle crank assembly according to the seventeenth aspect, the crank axle has an intermediate portion between the first end and the second end in the axial direction, and the first splines extend further in a radial direction than an outer peripheral surface of the intermediate portion.

With the bicycle crank assembly according to the eighteenth aspect, it is possible to effectively transmit a torque between a crank arm and a crank axle.

In a nineteenth aspect of the invention, in the bicycle crank assembly according to the eighteenth aspect, the crank axle is attached to the crank-axle-mounting portion of the crank arm in a press-fitted manner.

With the bicycle crank assembly according to the nineteenth aspect, it is possible to effectively transmit a torque between a crank arm and a crank axle.

In a twentieth aspect of the invention, in the bicycle crank assembly according to the eighteenth aspect, the crank axle is attached to the crank-axle-mounting portion of the crank arm by an adhesive.

With the bicycle crank assembly according to the twentieth aspect, it is possible to effectively transmit a torque between a crank arm and a crank axle.

In a twenty-first aspect of the invention, in the bicycle crank assembly according to any of the seventeenth to twentieth aspects, the crank axle has an intermediate portion between the first end and the second end in the axial direction, and an outer peripheral surface of the intermediate portion is flush with or disposed radially outwardly from the plurality of second splines.

With the bicycle crank assembly according to the twenty-first aspect, it is possible to effectively transmit a torque between a crank arm and a crank axle.

In a twenty-second aspect of the invention, the bicycle crank assembly according to any one of the previous aspects, the fixing member has a tool-engagement profile.

With the bicycle crank assembly according to the twenty-second aspect, it is possible to easily engage a first thread with a second thread by using a tool.

In a twenty-third aspect of the invention, in the bicycle crank assembly according to the twenty-second aspect, the tool-engagement profile is formed on a radially outer surface of the projection.

With the bicycle crank assembly according to the twenty-third aspect, it is possible to reliably contact an inner periphery of a fixing member to a crank axle because a tool-engagement profile is formed on a radially outer surface of the projection.

In a twenty-fourth aspect of the invention, the bicycle crank assembly according to any one of the previous aspects, the contact part is a separate member from the base portion.

With the bicycle crank assembly according to the twenty-fourth aspect, it is possible to increase the freedom to select a material for a contact part.

In a twenty-fifth aspect of the invention, in the bicycle crank assembly according to the twenty-fourth aspect, the contact part is made of a non-metallic material.

With the bicycle crank assembly according to the twenty-fifth aspect, it is possible to easily mount a fixing member on a crank axle in a press-fitting manner.

In a twenty-sixth aspect of the invention, in the bicycle crank assembly according to the twenty-fourth aspect or the twenty-fifth aspect, the contact part is at least partly annular.

With the bicycle crank assembly according to the twenty-sixth aspect, it is possible to easily mount a fixing member on a crank axle and to contact a contact part along an outer periphery of the crank axle.

In a twenty-seventh aspect of the invention, in the bicycle crank assembly according to the twenty-sixth aspect, the contact part has a slit extending in a radial direction with respect to the rotational center axis.

With the bicycle crank assembly according to the twenty-seventh aspect, it is possible to easily mount a fixing member on a crank axle.

In a twenty-eighth aspect of the invention, in the bicycle crank assembly according to any one of the twenty-fourth to twenty-seventh aspects, the base portion has a recess into which the contact part is at least partly located.

With the bicycle crank assembly according to the twenty-eighth aspect, it is possible to position a contact part to a base portion.

In a twenty-ninth aspect of the invention, in the bicycle crank assembly according to the twenty-eighth aspect, the recess includes a groove extending in a circumferential direction with respect to the rotational center axis.

With the bicycle crank assembly according to the twenty-ninth aspect, it is possible to position a contact part to a base portion so that the contact part does not move in the axial direction.

In a thirtieth aspect of the invention, in the bicycle crank assembly according to any one of the twenty-fourth to twenty-ninth aspects, the contact part is elastomeric.

With the bicycle crank assembly according to the thirtieth aspect, it is possible to easily mount a fixing member on a crank axle in a press-fitting manner.

In a thirty-first aspect of the invention, the bicycle crank assembly according to any one of the previous aspects, the contact part includes a protuberance extending radially inwardly from the inner periphery of the base portion.

With the bicycle crank assembly according to the thirty-first aspect, it is possible to effectively contact a contact part to a crank axle.

In a thirty-second aspect of the invention, in the bicycle crank assembly according to the thirty-first aspect, the protuberance extends radially inwardly from the inner periphery of the base portion by a distance that is equal to or smaller than 0.2 mm.

With the bicycle crank assembly according to the thirty-second aspect, it is possible to effectively contact a contact part to a crank axle.

In a thirty-third aspect of the invention, in the bicycle crank assembly according to any one of the first to twenty-third, thirty-first and thirty-second aspects, the base portion and the contact part are integrally formed with each other as a unitary, one-piece member.

With the bicycle crank assembly according to the thirty-third aspect, it is possible to easily manufacture a fixing member.

In a thirty-fourth aspect of the invention, the bicycle crank assembly according to any one of the previous aspects, the contact part has an axially inner end and an axially outer end, the crank axle has a tapered surface that is configured to contact the contact part of the fixing member in a state where the first thread is engaged with the second thread, and the tapered surface is inclined so that a diameter of the crank axle increases from the axially inner end toward the axially outer end.

With the bicycle crank assembly according to the thirty-fourth aspect, it is possible to firmly mount a fixing member on a crank axle in a press-fitting manner.

In a thirty-fifth aspect of the invention, in the bicycle crank assembly according to the thirty-fourth aspect, an angle defined between the tapered surface and the rotational center axis is equal to or smaller than two degrees.

With the bicycle crank assembly according to the thirty-fifth aspect, it is possible to firmly mount a fixing member on a crank axle in a press-fitting manner.

In a thirty-sixth aspect of the invention, the bicycle crank assembly according to any one of the previous aspects, the crank axle includes an additional contact part that is a separate member from the crank axle, and the additional contact part is configured to contact the contact part of the fixing member in a state where the first thread of the fixing member is engaged with the second thread.

With the bicycle crank assembly according to the thirty-sixth aspect, it is possible to increase freedom to select a material for an additional contact part.

In a thirty-seventh aspect of the invention, in the bicycle crank assembly according to the thirty-sixth aspect, the additional contact part is made of a non-metallic material.

With the bicycle crank assembly according to the thirty-seventh aspect, it is possible to firmly mount a fixing member on a crank axle in a press-fitting manner.

In a thirty-eighth aspect of the invention, a bicycle crank assembly includes: a crank arm including a crank-axle-mounting portion; a sprocket including a sprocket body and a plurality of sprocket teeth provided on an outer periphery of the sprocket body; a crank axle; and a fixing member including a tubular portion and a projection extending radially outwardly from an outer periphery of the tubular portion with respect to a rotational center axis. The tubular portion has a first thread that is configured to engage with a second thread provided on the crank-axle mounting portion of the crank arm, the first thread is formed on the outer periphery of the tubular portion, the projection is configured to prevent the sprocket from moving relative to the crank axle in an axial direction parallel to the rotational center axis, and the fixing member has a tool-engagement profile formed on a radially outer surface of the projection.

With the bicycle crank assembly according to the thirty-eighth aspect, it is possible to reliably contact an inner periphery of a fixing member to a crank axle because a tool-engagement profile is formed on a radially outer surface of the projection.

In a thirty-ninth aspect of the invention, a bicycle crank assembly includes: a crank arm including a crank-axle-mounting portion; a sprocket including a sprocket body and a plurality of sprocket teeth provided on an outer periphery of the sprocket body; a crank axle; and a fixing member including a base portion and a projection. The projection extends radially outwardly from an outer periphery of the base portion with respect to a rotational center axis, and the base portion has a first thread configured to engage with a second thread provided on one of the crank arm and the crank axle. The bicycle crank assembly further includes seal member configured to be located between the fixing member and the crank axle in a radial direction with respect to the rotational center axis.

With the bicycle crank assembly according to the thirty-ninth aspect, it is possible to prevent water, dust and so on from entering between a fixing member and a crank axle.

In a fortieth aspect of the invention, in the bicycle crank assembly according to the thirty-ninth aspect, the seal member has a proximal end and a distal end, the proximal end is fixed to the fixing member, and the distal end contacts a bottom bracket assembly.

With the bicycle crank assembly according to the fortieth aspect, it is possible to prevent water, dust and soon from entering between a fixing member and a bottom bracket assembly.

In a forty-first aspect of the invention, in the bicycle crank assembly according to the thirty-ninth aspect or the fortieth aspect, the seal member has a proximal end and a distal end, the distal end is fixed to the fixing member and the proximal end contacts the crank axle.

With the bicycle crank assembly according to the forty-first aspect, it is possible to prevent water, dust and so on from entering between a fixing member and a crank axle.

DESCRIPTION OF THE EMBODIMENTS

Selected embodiments of the present invention will now be described with reference to the accompanying drawings. It will be apparent to those skilled in the art from this disclosure that the following description of various embodiments of the invention is provided for illustration only and not for the purpose of limiting the invention as defined by the appended claims and their equivalents.

Figure 1:
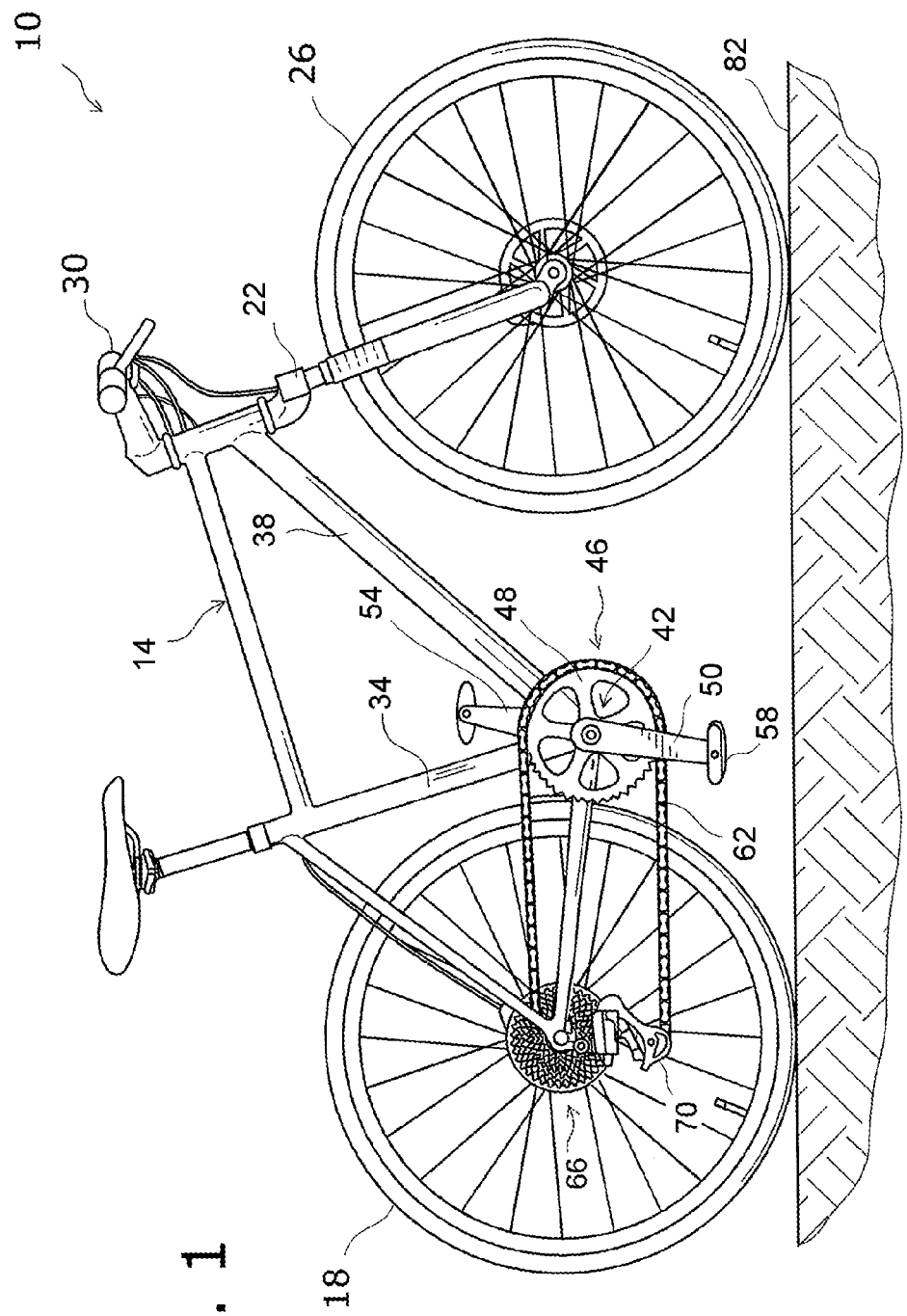
FIG. 1 is a right side view of a bicycle having a bicycle crank assembly of the present invention.

Referring initially to FIG. 1, an exemplary bicycle 10 according to at least one disclosed embodiment of the present invention is shown. The bicycle 10 includes a frame 14 attached to a rear wheel 18. A front fork 22 attaches a front wheel 26 to the frame 14. A handlebar 30 is attached to the frame 14. The frame 14 includes a seat tube 34 and a downtube 38, which meet at a bottom bracket assembly 42. A bicycle crank assembly 46 is supported by the bottom bracket assembly 42.

The bicycle crank assembly 46 includes a sprocket 48, a crank arm 50, which is a first crank arm, a second crank arm 54 and pedals 58. The pedals 58, the first crank arm 50, and the second crank arm 54 are coupled to the sprocket 48 to drive the sprocket 48 in a known manner. A chain 62 transmits power from the sprocket 48 to a rear sprocket assembly 66. A rear transmission device 70 changes the position of the chain 62 on the rear sprocket assembly 66 in a known manner. Except for the bicycle crank assembly 46, the bicycle 10 is conventional and is not described in detail except to the extent necessary to describe the operation and surroundings of the bicycle crank assembly 46.

For reference purposes, the bicycle 10 is considered to be in an upright position in FIG. 1 such that the axis (unnumbered) of the rear wheel 18 is parallel to a horizontal support plane 82 on which the bicycle 10 rests. A vertical center plane 86 passes through the center of the bicycle frame 14 (See FIG. 2). The vertical center plane 86 is perpendicular to an axis of the rear wheel 18. The vertical center plane 86 is perpendicular to the horizontal support plane 82 shown in FIG. 1 when the bicycle 10 is in the upright position. In the present application, the following directional terms "forward", "rearward", "left", "right", "upward" and "downward" and any other similar directional terms refer to directions that are determined with respect to a rider who sits on the bicycle 10 facing the handlebar 30 in a riding position when the bicycle 10 is in the upright position of FIG. 1.

Figure 2:
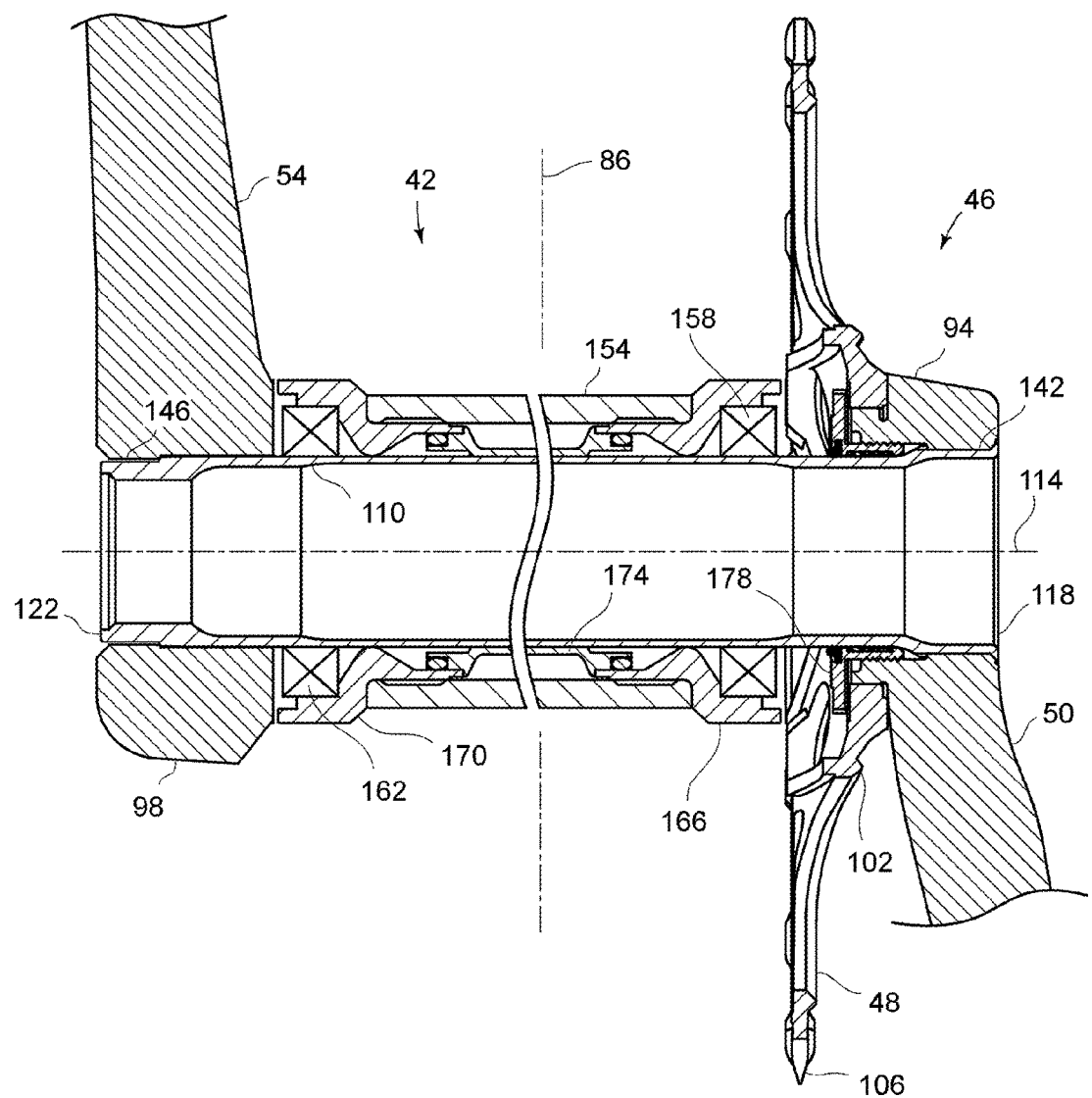
FIG. 2 is a partial cross sectional view of the crank assembly of the bicycle of FIG. 1.

Referring to FIG. 2, the bicycle crank assembly 46 includes the crank arm 50, which includes a crank-axle-mounting portion 94. The bicycle crank assembly 46 further includes the sprocket 48. The sprocket 48 includes a sprocket body 102 and a plurality of sprocket teeth 106, which are provided on an outer periphery of the sprocket body 102.

Figure 3:
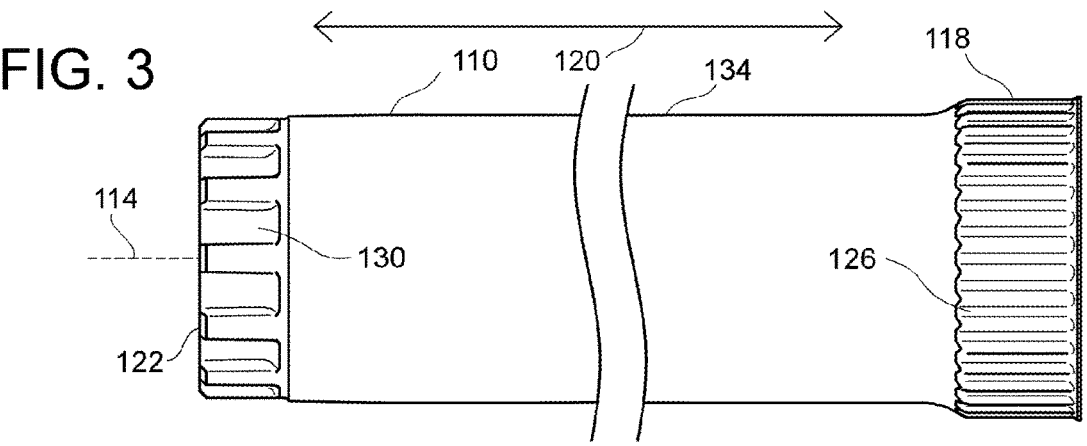
FIG. 3 is a side view of the crank axle of FIG. 2.
Figure 4:
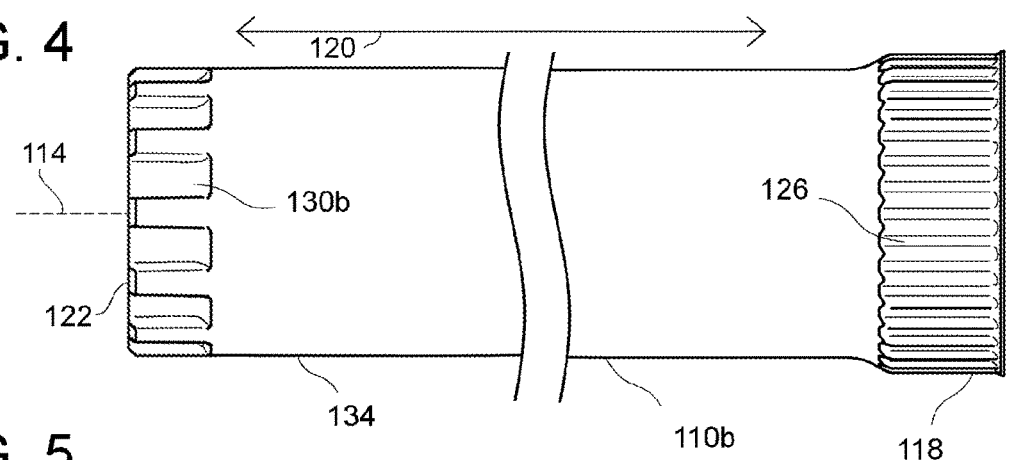
FIG. 4 is a further embodiment of the crank axle of FIG. 2.

The bicycle crank assembly 46 further includes a crank axle 110. Referring to FIG. 2, the crank axle 110 has a rotational center axis 114, which is perpendicular to the vertical center plane 86. The rotational center axis 114 is a rotational center axis of the bicycle crank assembly 46. Referring to FIG. 3, the crank axle 110 has a first end 118 and a second end 122, and the second end 122 is opposite to the first end 118 in an axial direction 120 of the rotational center axis 114 of the bicycle crank assembly 46. In the illustrated embodiment, a plurality of first splines 126 is provided on the first end 118, and a plurality of second splines 130 is provided on the second end 122. The crank axle 110 has an intermediate portion 134 between the first end 118 and the second end 122 in the axial direction 120. In the embodiments of FIGS. 3 and 4, the first splines 126 extend further in a radial direction than an outer peripheral surface of the intermediate portion 134. In the crank axle 110 of FIG. 3, the plurality of second splines 130 has a maximum diameter that is less than that of the intermediate portion 134. However, in the crank axle 110b of FIG. 4, the plurality of second splines 130b has a maximum diameter that is the equal to that of the intermediate portion 134. Thus, in the embodiments of FIGS. 3 and 4, the outer peripheral surface of the intermediate portion 134 is flush with or disposed radially outwardly from the plurality of second splines 130, 130b.

A first set of inner splines 142 is formed on the crank-axle-mounting portion 94 of the first crank arm 50, which is a first crank-axle-mounting portion 94. More specifically, the crank-axle mounting portion 94 includes a through-hole 150 through which the crank axle 110 passes. The inner splines 142 are formed on a periphery of the through-hole 150. A second set of inner splines 146 is formed on a second crank-axle-mounting portion 98 of the second crank arm 54. The first set of inner splines 142 mates with the plurality of first splines 126 on the crank axle 110, and the second set of inner splines 146 mates with the plurality of second splines 130 on the crank axle 110 in the assembled state of the bicycle crank assembly 46 as shown in FIG. 2. Thus, torque is positively transmitted between the crank arms 50, 54 and the crank axle 110.

Referring again to FIG. 2, the bicycle crank assembly 46 is supported by the bottom bracket assembly 42, which is mounted to a bottom bracket hanger 154. The bottom bracket hanger 154 is fixed to the seat tube 34 and the down tube 38 in a conventional manner. A first bearing 158 and a second bearing 162 are located between the crank axle 110 and the bottom bracket hanger 154 to support the crank axle 110 in the bottom bracket hanger 154 so that the crank axle 110 can rotate about the rotational center axis 114 with respect to the bottom bracket hanger 154, i.e., the frame 14. The first bearing 158 is located in a first cylindrical bearing housing 166, and the second bearing 162 is located in a second cylindrical bearing housing 170. A cylindrical tube 174 is located between the first cylindrical bearing housing 166 and the second cylindrical bearing housing 170. The first cylindrical bearing housing 166 and the second cylindrical bearing housing 170 are fitted to opposite ends of the bottom bracket hanger 154 as shown in FIG. 2. As shown in FIG. 2 and as best illustrated in FIG. 6, the sprocket 48 is fixed to the crank-axle-mounting portion 94 by a fixing member 178, which is described in detail below.

Figure 6:
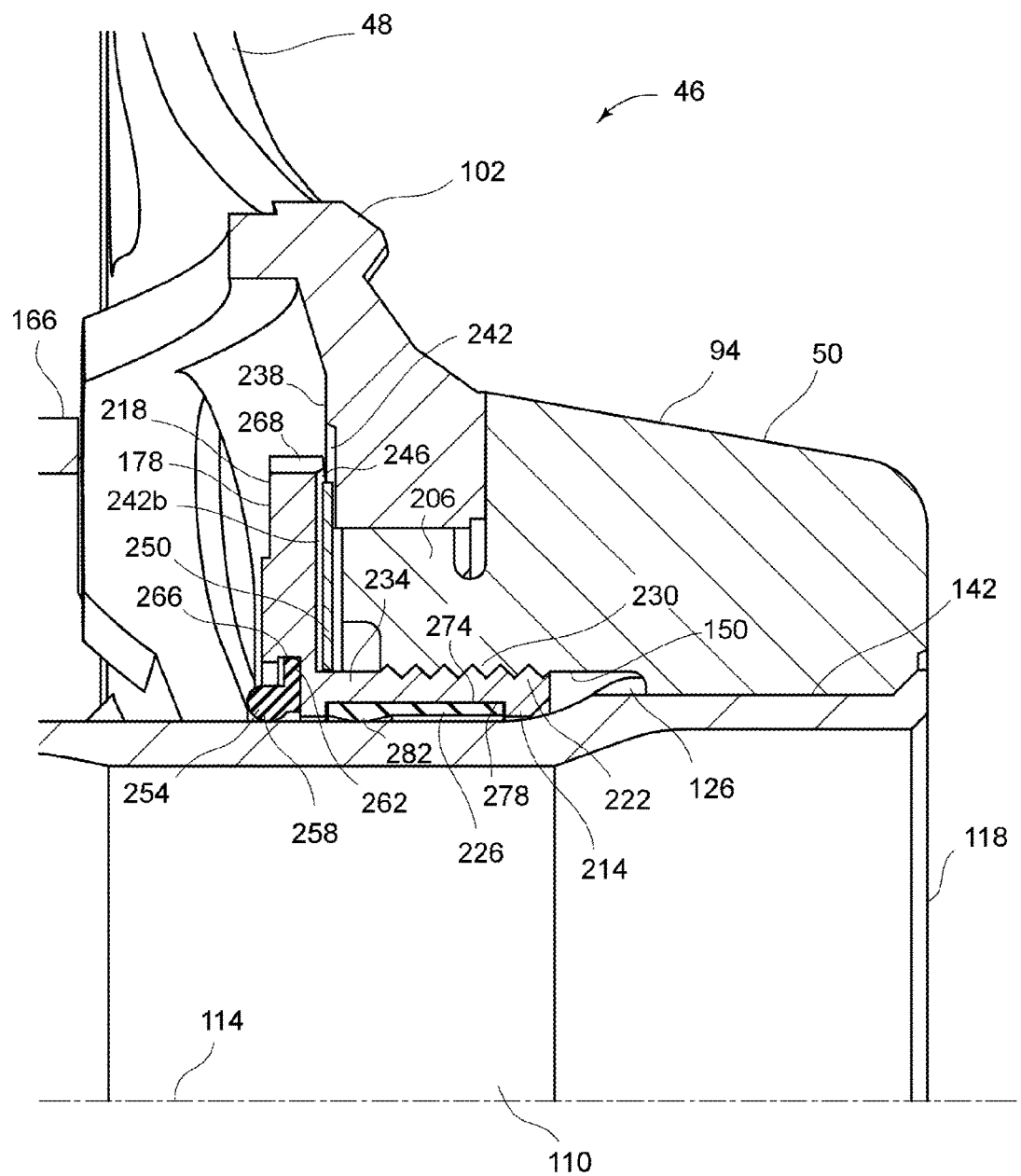
FIG. 6 is a partial cross-sectional view of the crank assembly of FIG. 2.
Figure 11:
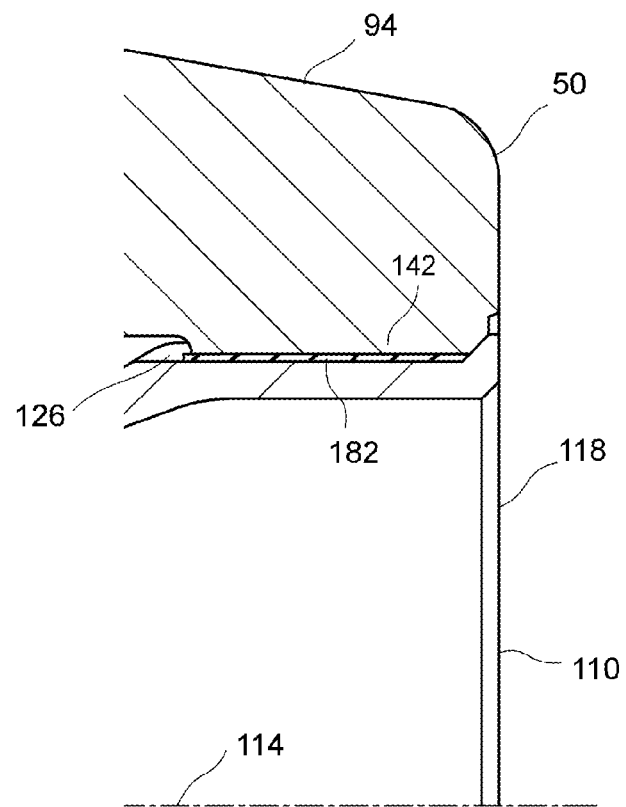
FIG. 11 is a partial cross-sectional view of a further embodiment of the crank assembly of FIG. 6.

In the embodiment shown in FIG. 6, the crank axle 110 is attached to the crank-axle-mounting portion 94 of the crank arm 50 in a press-fitted manner. Specifically the crank axle 110 is inserted into the through-hole 150. That is, in the embodiment of FIG. 6, the crank axle 110 is press-fitted into the crank-axle-mounting portion 94 to form an interference fit. However, press-fitting is not required to secure the crank axle 110 to the crank-axle-mounting portion 94. Alternatively, in the embodiment shown in FIG. 11, the crank axle 110 is attached to the crank-axle-mounting portion 94 of the crank arm 50 by an adhesive 182. That is, the adhesive 182 is located between the first set of inner splines 142, which is on the crank-axle mounting portion 94, and the plurality of first splines 126, which is on the crank axle 110. Further, although not illustrated, the crank axle 110 can be secured to the crank-axle-mounting portion 94 by other methods such as welding or diffusion bonding. Although splines are employed in the illustrated embodiment to transmit torque, other known profiles or torque-transmitting structures can alternatively be employed between the crank axle 110 and the crank-axle-mounting portion 94.

Figure 5:
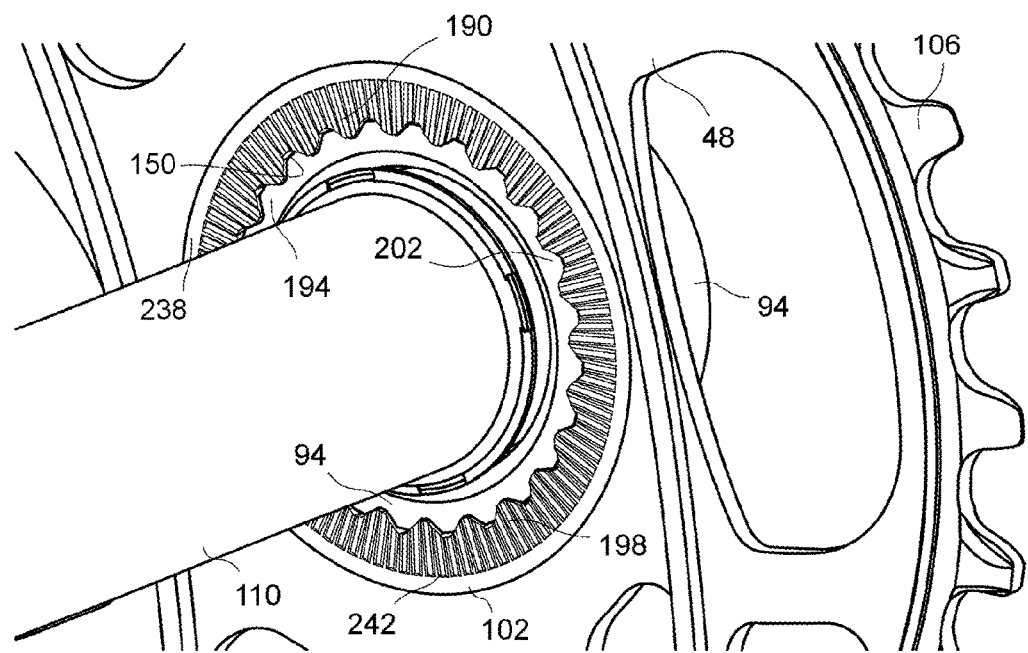
FIG. 5 is a partial perspective view of the crank assembly of FIG. 2.

Referring to FIG. 5, the sprocket body 102 has a first torque-transmitting profile 190, and the crank-axle-mounting portion 94 has a second torque-transmitting profile 194 that is configured to engage with the first torque-transmitting profile 190. In the embodiment of FIGS. 5 and 6, the first torque transmitting profile 190 includes a plurality of inner splines 198, and the second torque transmitting profile 194 includes a plurality of outer splines 202. The plurality of inner splines 198 protrudes from a center hole of the sprocket body 102 in a radially inward direction about the rotational center axis 114. The plurality of outer splines 202 protrudes from a radially outer surface of the crank-axle mounting portion 94 (specifically, a mounting boss 206 of the crank-axle mounting portion 94) in a radially outward direction about the rotational center axis 114. FIG. 5 shows the inner splines 198 mated to the outer splines 202. Thus, torque can be positively transmitted between the sprocket 48 and the crank-axle-mounting portion 94. In the view of FIG. 5, the fixing member 178 has been removed for purposes of illustration. Although splines 198, 202 are employed in the illustrated embodiments, other torque-transmitting profiles or structures can be alternatively employed. For example, the torque between the sprocket 48 and the crank-axle-mounting portion 94 can be transmitted via a fastener to fix the sprocket 48 to the crank arm 50.

Referring to FIG. 6, the fixing member 178 is a cylindrical member for fixing the sprocket 48 to the crank-axle-mounting portion 94 and to the crank axle 110. The fixing member 178 can be made of strong, light metal, such as steel or aluminum alloy, for example. The fixing member 178 includes a base portion 214, a projection 218 and a first thread 222. The projection 218 extends radially outwardly from an outer periphery of the base portion 214 with respect to the rotational center axis 114 of the bicycle crank assembly 46. The projection 218 is configured to prevent the sprocket 48 from moving relative to the crank axle 110 in an axial direction parallel to the rotational center axis 114. The sprocket 48 is partly located between the projection 218 and the crank-axle-mounting portion 94 in the axial direction. The fixing member 178 includes a contact part 226 provided on an inner periphery of the base portion 214. The contact part 226 is configured to contact the crank axle 110 in a state where the first thread 222 of the fixing member 178 is engaged with a second thread 230 provided on one of the crank arm 50 and the crank axle 110. The contact part 226 allows force to be transmitted in a radial direction between the crank axle 110 and the fixing member 178. Thus, radially-directed force can be transmitted between the fixing member 178 and a part of the crank axle 110 that is axially and inwardly spaced from the location at which the crank axle 110 is fixed to the crank-axle-mounting portion 94.

Referring to FIG. 6, the projection 218 is essentially a flange in this embodiment. Further, FIG. 6 shows that the base portion 214 has an annular shape. In addition, FIG. 6 shows that the base portion 214 has a tubular shape. That is, the base portion 214 in the embodiment of FIG. 6 forms a hollow cylinder about the crank axle 110. The fixing member 178 has a generally L-shaped cross-section when viewed in a half-cross-sectional plane that includes the rotational center axis 114, as seen in FIG. 6.

Thus, in FIG. 6, the fixing member 178 includes a tubular portion 234 and a projection 218 extending radially outwardly from an outer periphery of the tubular portion 234 with respect to the rotational center axis 114. The tubular portion 234 has the first thread 222 that is configured to engage with a second thread 230 provided on the crank-axle mounting portion 94 of the crank arm 50. The first thread 222 is formed on the outer periphery of the tubular portion 234.

Figure 10:
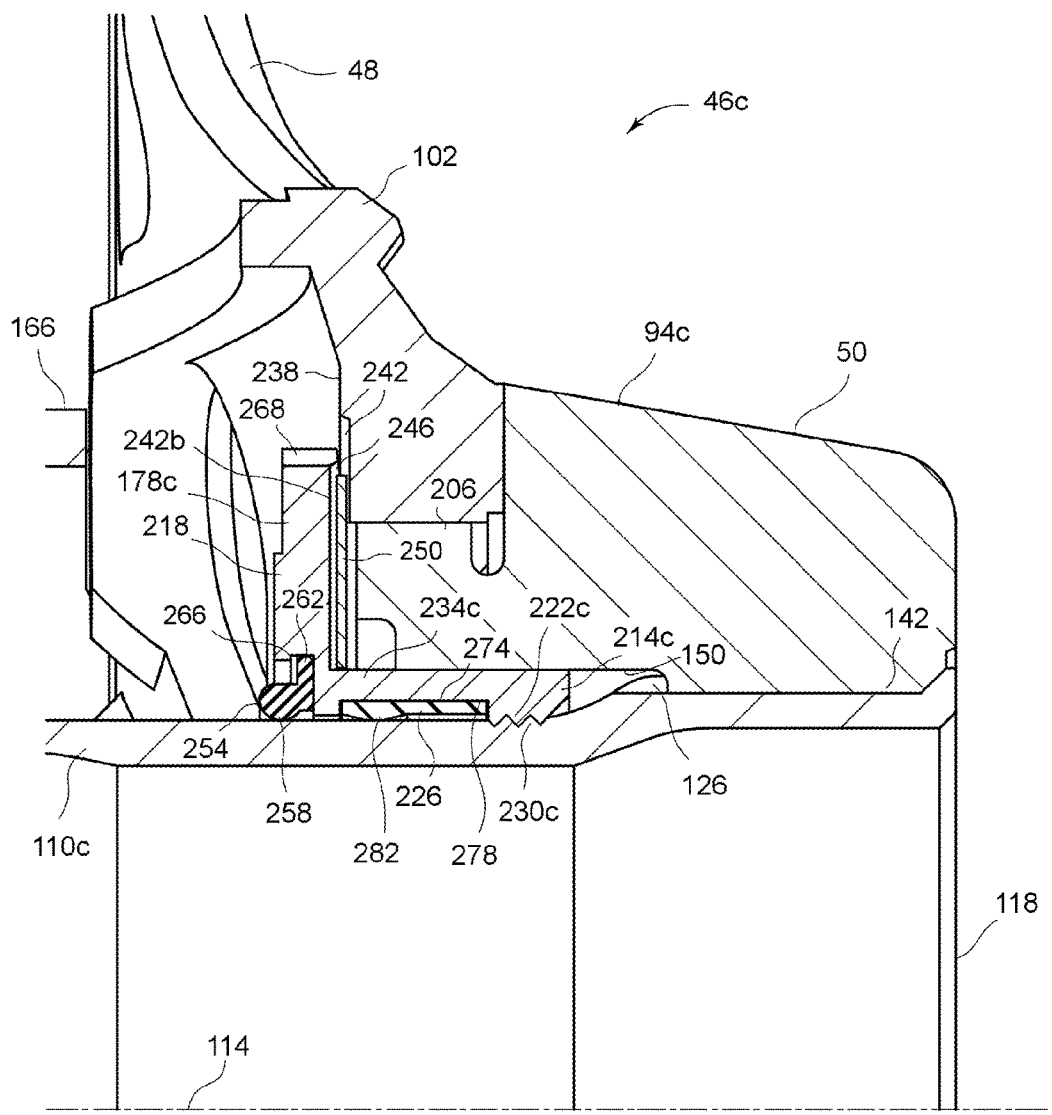
FIG. 10 is a partial cross-sectional view of a further embodiment of the crank assembly of FIG. 2.

In the embodiment of FIG. 6, the first thread 222 is provided on the base portion 214, and the second thread 230 is provided on the crank arm 50. In the embodiment of FIG. 6, the second thread 230 is provided on the crank-axle-mounting portion 94 of the crank arm 50. More specifically, the second thread 230 is formed on an inner periphery of a mounting boss 206 of the crank-axle mounting portion 94. In the embodiment of FIG. 6, the first thread 222 is provided on an outer periphery of the base portion 214. In an alternate bicycle crank assembly 46c of FIG. 10, the second thread 230c is formed on the crank axle 110c. In the embodiment of FIG. 10, the first thread 222c is formed on an inner surface of the base portion 214c, or the tubular portion 234c. Thus, the base portion 214, 214c has a first thread 222, 222c configured to engage with a second thread 230, 230c provided on one of the crank arm 50 and the crank axle 110c.

Referring to FIG. 6, the base portion 214 is configured to be partly disposed between the crank-axle-mounting portion 94 of the crank arm 50 and the crank axle 110 in a radial direction with respect to the rotational center axis 114 in a state where the first thread 222 is engaged with the second thread 230. Further, the projection 218 extends from an outer periphery of the base portion 214 in a circumferential direction with respect to the rotational center axis 114. Although it is not required for the projection 218 to extend about the entire periphery of the base portion 214, in the embodiment of FIG. 6, the projection 218 extends completely around the outer periphery of the base portion 214 in a circumferential direction with respect to the rotational center axis 114. In other words, in the embodiment of FIG. 6, the projection 218 forms a full three-hundred-and-sixty-degree ring about the base portion 214.

As shown in FIG. 5, the sprocket body 102 has a projection-facing surface 238 on which knurling 242 is formed. Referring to FIG. 6, the projection 218 has a sprocket-facing surface 246 on which knurling 242b is formed. In the embodiment of FIG. 5, the knurling 242 on the projection-facing surface 238 of the sprocket body 102 is formed by radially-extending teeth. The knurling 242b formed on the sprocket-facing surface 246 of the projection 218 is also formed by radially-extending teeth. However, other types of knurling can be employed. In the illustrated embodiments, the knurling 242, 242b on both the sprocket-facing surface 246 of the projection 218 and the projection-facing surface 238 of the sprocket body 102 is provided in an annular pattern that extends entirely about the rotational center axis 114 of the bicycle crank assembly 46; however, it is not required for the knurling 242, 242b to extend entirely about the rotational center axis 114 of the bicycle crank assembly 46. For example, the knurling 242, 242b can be provided at spaced circumferential intervals.

Referring further to FIG. 6, the bicycle crank assembly 46 includes a washer 250 configured to be located between the sprocket body 102 and the projection 218 in the axial direction 120. The washer 250 in the illustrated embodiment of FIG. 6 is circular and extends entirely about the rotational center axis 114 of the bicycle crank assembly 46. The washer 250 provides material into which the teeth of the knurling 242, 242b bite. The washer 250 can be made of various materials such as metal (e.g. aluminum alloy) or plastic. The washer 250 is not required and can be omitted.

In the embodiment of FIG. 6, the bicycle crank assembly 46 further includes a seal member 254 configured to be located between the fixing member 178 and the crank axle 110 in a radial direction with respect to the rotational center axis 114. The seal member 254 of this embodiment is annular and extends entirely about the surface of the crank axle 110. In the embodiment of FIG. 6, the seal member 254 has a proximal end 258 and a distal end 262. The distal end 262 is fixed to the fixing member 178 and the proximal end 258 contacts the crank axle 110. For example, an annular groove 266 can be formed in the inner periphery of the projection 218, and the distal end 262 of the seal member 254 can be fitted into the annular groove 266 as shown in FIG. 6. Alternatively, the annular groove to receive the seal member 254 can be formed on an inner periphery of the base portion 214. The seal member 254 in the illustrated embodiments is preferably made of elastomeric material such as rubber or plastic.

Figure 9:
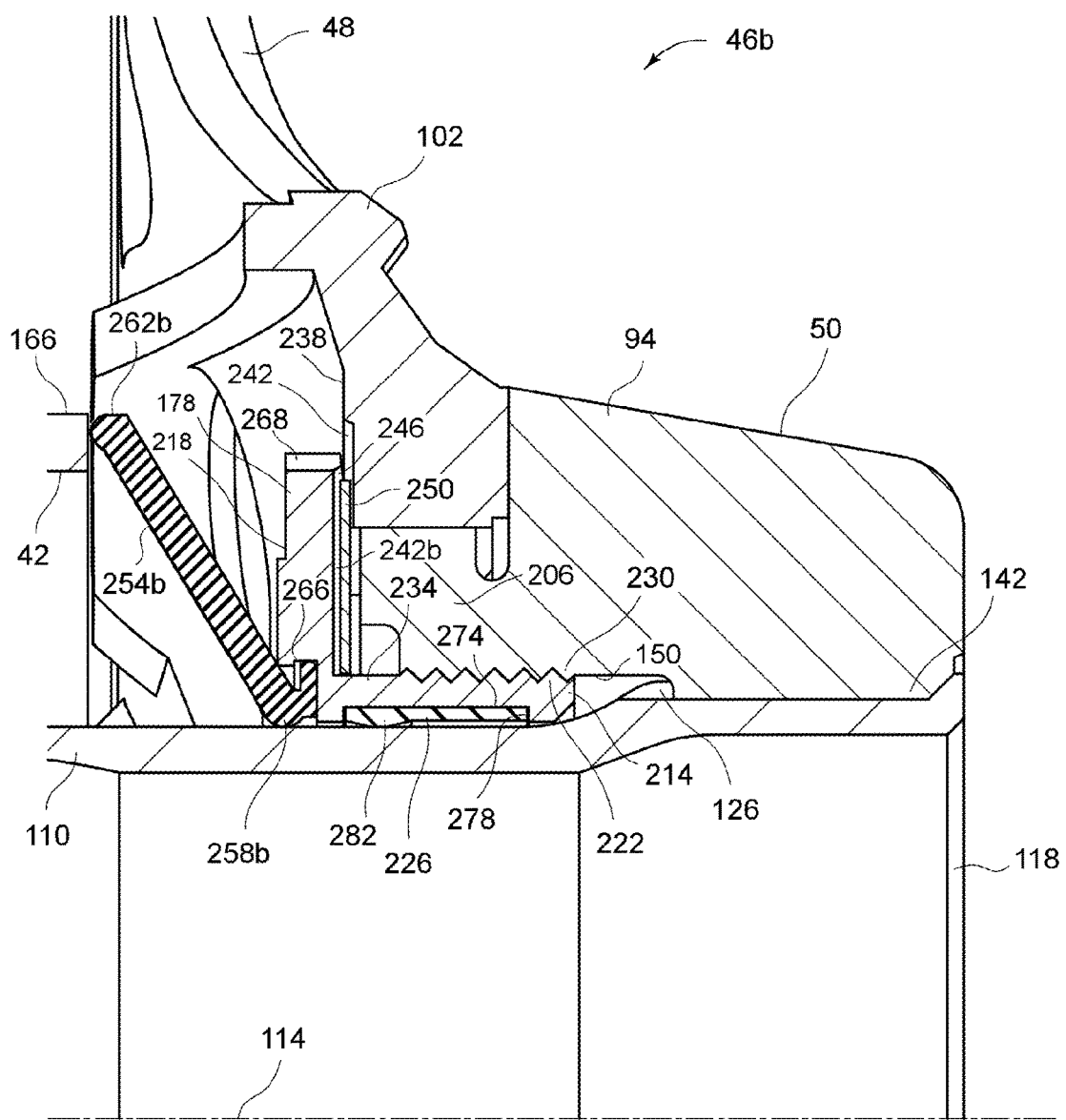
FIG. 9 is a partial cross-sectional view of a further embodiment of the crank assembly of FIG. 2.

In the bicycle crank assembly 46b of FIG. 9, the seal member 254b also forms a seal between the bottom bracket assembly 42 and the fixing member 178. As shown in FIG. 9, the seal member 254b has a proximal end 258b and a distal end 262b. The proximal end 258b is fixed to the fixing member 178, and the distal end 262b contacts the bottom bracket assembly 42. More specifically, in the embodiment of FIG. 9, the distal end 262b contacts an end surface of the first cylindrical bearing housing 166. However, the seal member 254b can be shaped to contact other parts, such as the first bearing 158. Except for the seal member 254b, the bicycle crank assembly 46b of FIG. 9 is essentially the same as that of FIG. 6.

Figure 7:
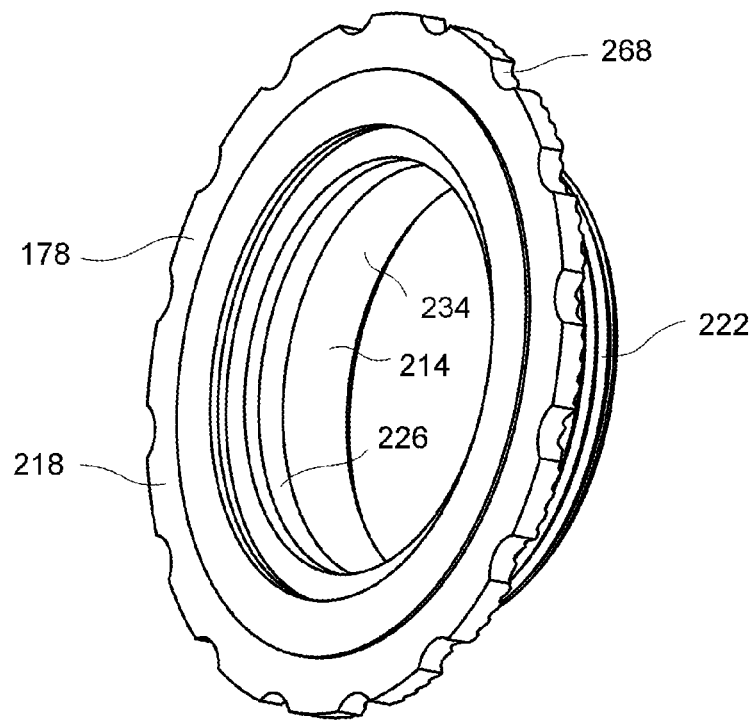
FIG. 7 is a perspective view of the fixing member of FIG. 6.
Figure 8:
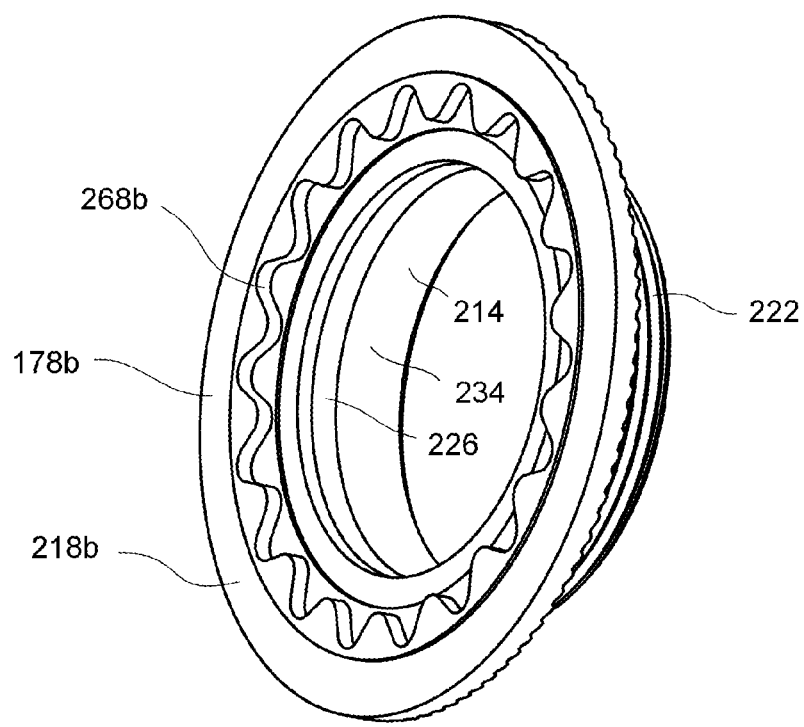
FIG. 8 is a perspective view of a further embodiment of the fixing member of FIG. 6.

The fixing member 178 has a tool-engagement profile 268. As shown in FIGS. 6 and 7 the tool-engagement profile 268 is formed on a radially outer surface of the projection 218. In the embodiment of FIGS. 6 and 7, the tool-engagement profile 268 is formed by a pattern of recesses; however other tool-engagement profiles can be employed. For example, the radially outer surface of the projection 218 can have a polygonal shape (not illustrated) as the tool-engagement profile. As shown in FIG. 8, as an alternative, an inner tool-engagement profile 268b can be formed on an inner peripheral surface of the projection 218b of the fixing member 178b. A tool with a matching profile (not illustrated) can be used to tighten or loosen the fixing member 178 by rotating the fixing member 178 about the axis of the crank assembly. However the tool-engagement profile 268 formed on the radially outer surface of the projection 218 is more preferred than the inner tool-engagement profile 268b on the inner peripheral surface of the projection 218b, to provide the contact part 226 on the inner periphery of the base portion 214. The tool-engagement profile 268 facilitates maintenance work on the bicycle crank assembly 46.

In the embodiments of FIGS. 6, 9, and 10, for example, the contact part 226 is a separate member from the base portion 214, 214c. Thus, the contact part 226 is installed in the fixing member 178, 178c during assembly. Further, in the embodiments of FIGS. 6, 9 and 10, the contact part 226 is made of a non-metallic material. In these embodiments, the contact part 226 is elastomeric. For example, the contact part 226 can be made of plastic or rubber.

Figure 12:
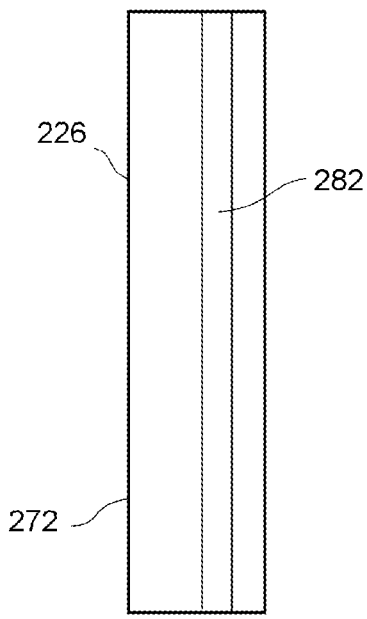
FIG. 12 is a plan view of the contact part of the crank assembly of FIG. 6 prior to assembly.
Figure 13:
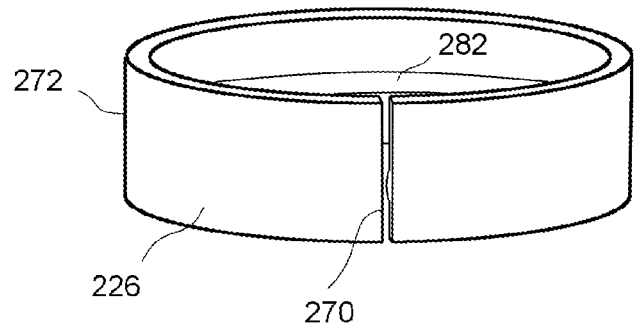
FIG. 13 is a perspective view of the contact part of the crank assembly of FIG. 6 prior to assembly.

In at least the embodiment of FIG. 6, for example, the contact part 226, which is illustrated in FIG. 13, is a flexible strip 272 that can be wrapped around the base portion 214. The exemplary flexible strip 272 is illustrated in FIG. 12 in a flat state prior to being wrapped around the base portion 214. Referring to FIG. 13, the contact part 226 is at least partly annular in an installed state on the fixing member 178, 178c. In addition, as shown in FIG. 13, the contact part 226 has a slit 270 extending in a radial direction with respect to the rotational center axis 114. The slit 270 is formed where the ends of the flexible strip 272 come together. However, there is not necessarily a gap formed where the ends of the flexible strip 272 come together, since the ends of the flexible strip 272 can contact one another when the contact part 226 is installed on the fixing member 178. The flexible strip 272 can be extruded, which lowers manufacturing costs. However, the contact part 226 can be formed as a continuous, annular belt.

In the embodiments of FIGS. 6, 9, and 10, for example, the base portion 214, 214c has a recess 274 into which the contact part 226 is at least partly located. For example, as shown in FIG. 6, the recess 274 includes a groove 278 extending in a circumferential direction with respect to the rotational center axis 114. In the illustrated embodiments, the recess 274 has a uniform depth and extends about the entire circumference of the fixing member 178.

Figure 14:
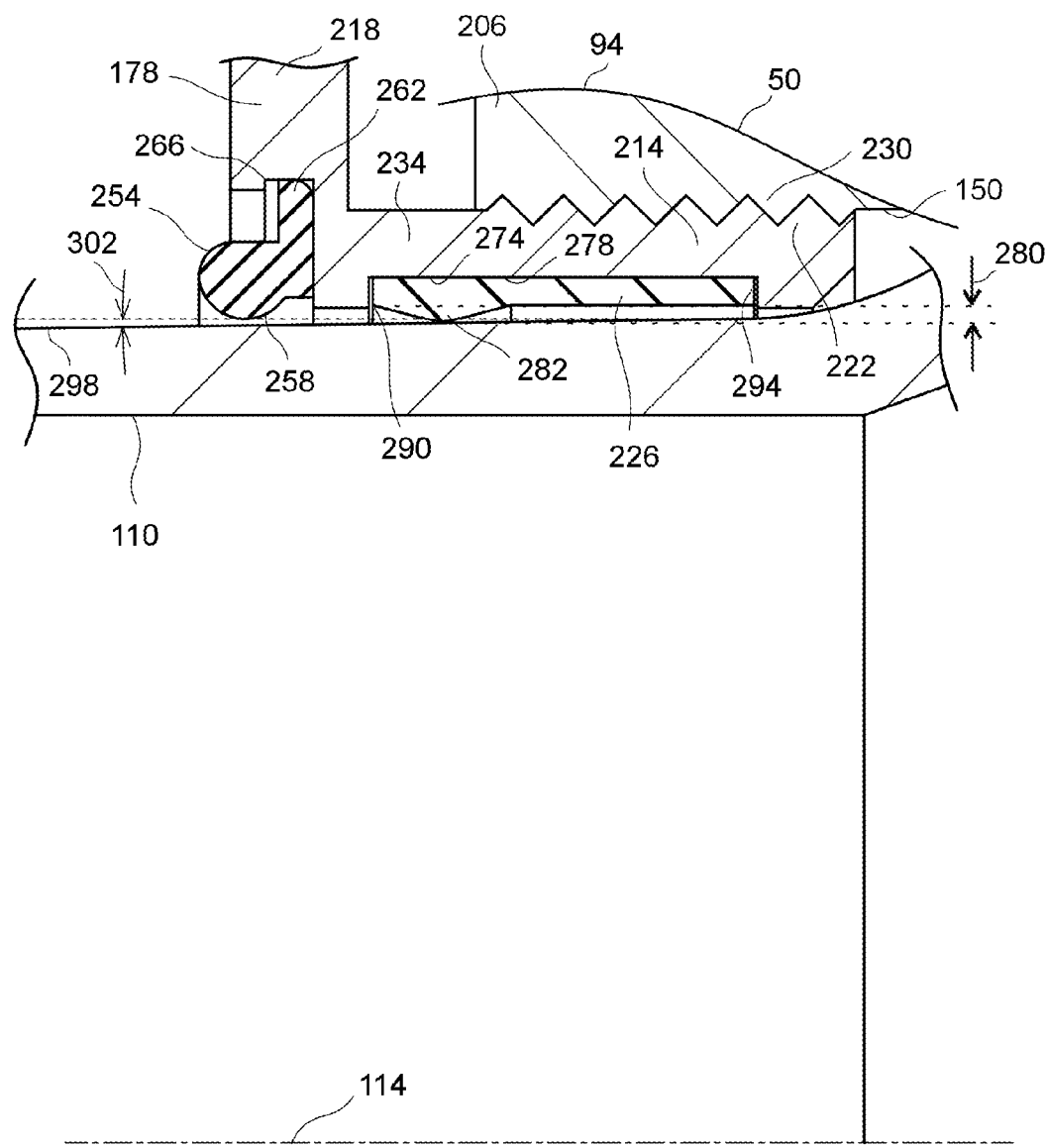
FIG. 14 is a partial, enlarged cross-sectional view of the crank assembly of FIG. 6.

Referring to FIG. 14, for example, which shows a partial, enlarged region of FIG. 6, the contact part 226 includes a protuberance 282 extending radially inwardly from the inner periphery of the base portion 214. In the exemplary embodiment of FIG. 6 and FIG. 14, the protuberance 282 extends radially inwardly from the inner periphery of the tubular portion 234 (base portion 214) by a distance 280 that is equal to or smaller than 0.2 mm. More preferably, the distance 280 is equal to or smaller than 0.1 mm.

Referring to FIG. 14, the contact part 226 has an axially inner end 290 and an axially outer end 294. The crank axle 110 has a tapered surface 298 that is configured to contact the contact part 226 of the fixing member 178 in a state where the first thread 222 is engaged with the second thread 230. The tapered surface 298 is inclined so that a diameter of the crank axle 110 increases from the axially inner end 290 toward the axially outer end 294. Preferably, an angle 302 defined between the tapered surface 298 and the rotational center axis 114 is equal to or smaller than two degrees. More preferably, the angle 302 is equal to or smaller than one degree.

Figure 15:
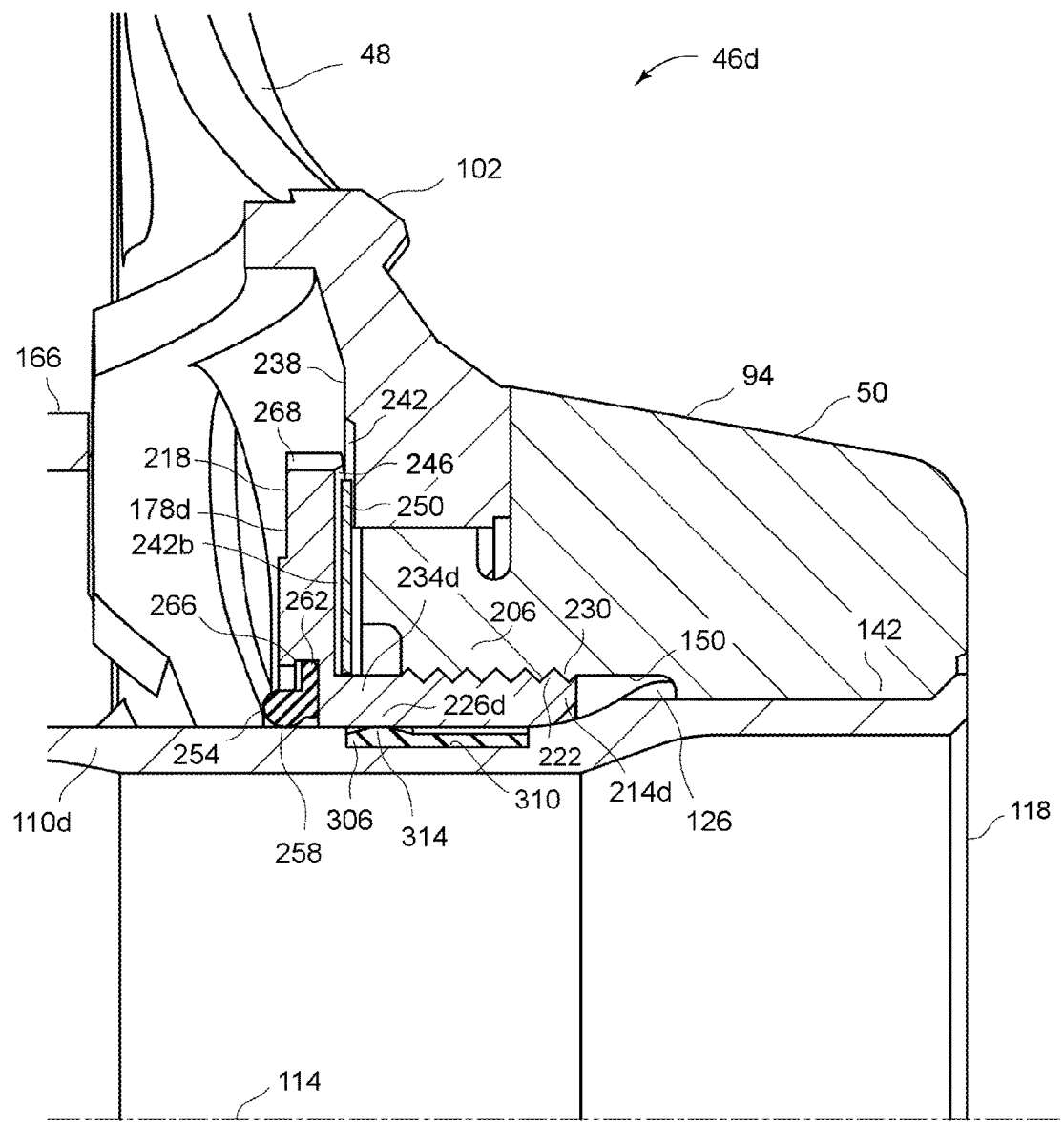
FIG. 15 is a partial cross-sectional view of a further embodiment of the crank assembly of FIG. 2.
Figure 16:
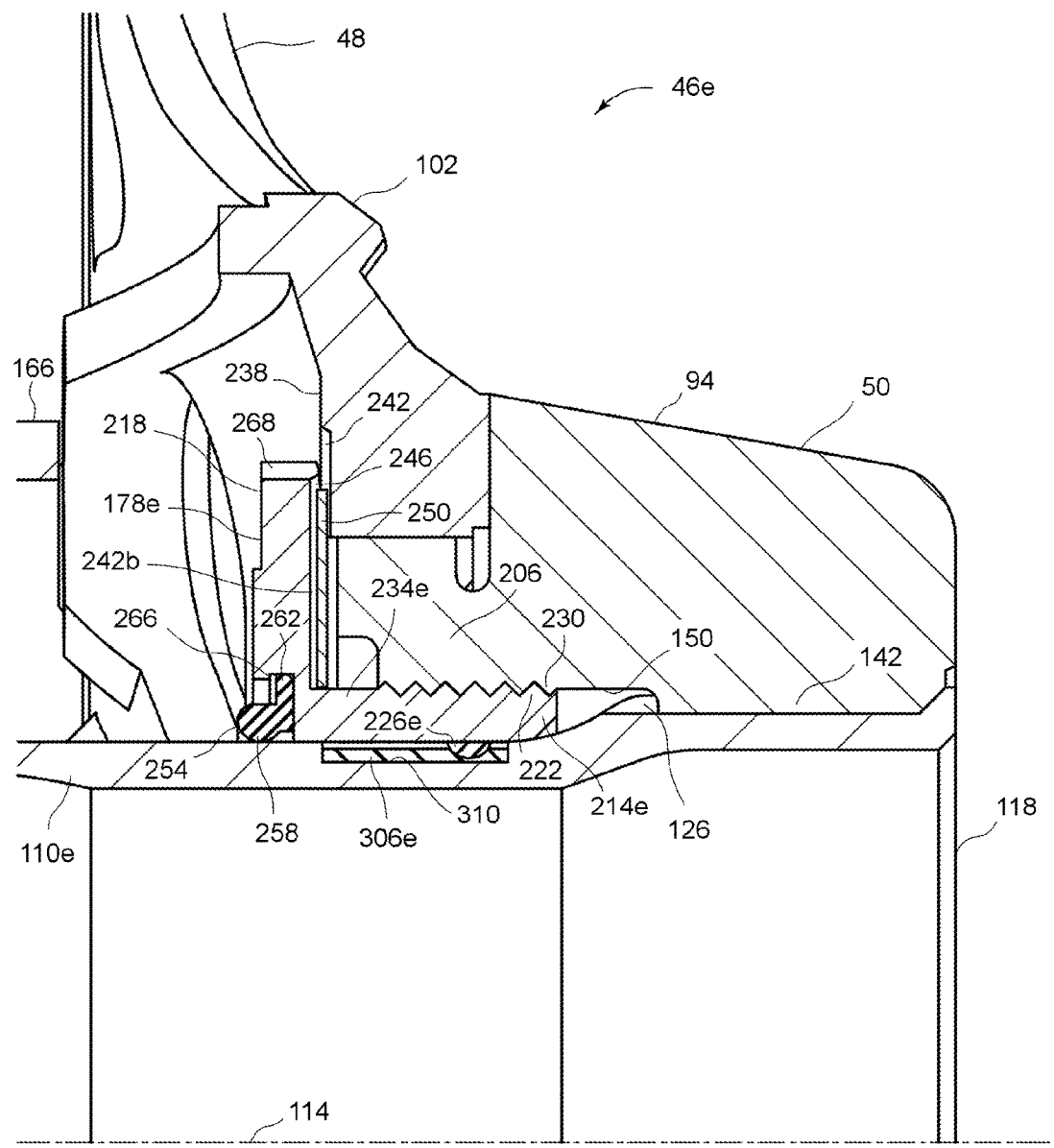
FIG. 16 is a partial cross-sectional view of a further embodiment of the crank assembly of FIG. 2

Referring to FIGS. 15 and 16, in alternate bicycle crank assemblies 46d and 46e, the crank axle 110d, 110e includes an additional contact part 306, 306e that is a separate member from the crank axle 110d, 110e. The additional contact part 306, 306e is configured to contact the contact part 226d, 226e of the fixing member 178d, 178e in a state where the first thread 222 of the fixing member 178d, 178e is engaged with the second thread 230. The additional contact part 306 of FIG. 15 can be fitted in a circumferential recess 310 formed in the crank axle 110d. The additional contact part 306e of FIG. 16 can be fitted in a circumferential recess 310 formed in the crank axle 110e. Otherwise, bicycle crank assemblies 46d and 46e of FIGS. 15 and 16 are essentially the same as the bicycle crank assembly 46 of FIG. 6. Further, in the embodiments of FIGS. 15 and 16, the additional contact part 306, 306e is made of a non-metallic material. For example, the additional contact part 306, 306e can be elastomeric and can be, for example, plastic or rubber. Also, the additional contact part 306, 306e can be formed in the shape of a strip, like the contact part 226 of FIG. 12.

In the embodiment of FIG. 15, the additional contact part 306 has a protuberance 314 that extends in a radially outward direction toward the contact part 226d of the fixing member 178d. In the embodiment of FIG. 16, the contact part 226e is elastomeric and is circumferentially arranged on the inner periphery of the fixing member 178e, and the additional contact part 306e is elastomeric and is arranged circumferentially on the outer periphery of the crank axle 110e. In the embodiment of FIG. 16, although not illustrated, the contact part 226e on the fixing member 178e can be fitted in a recess, like the contact part 226 in FIG. 6.

Figure 17:
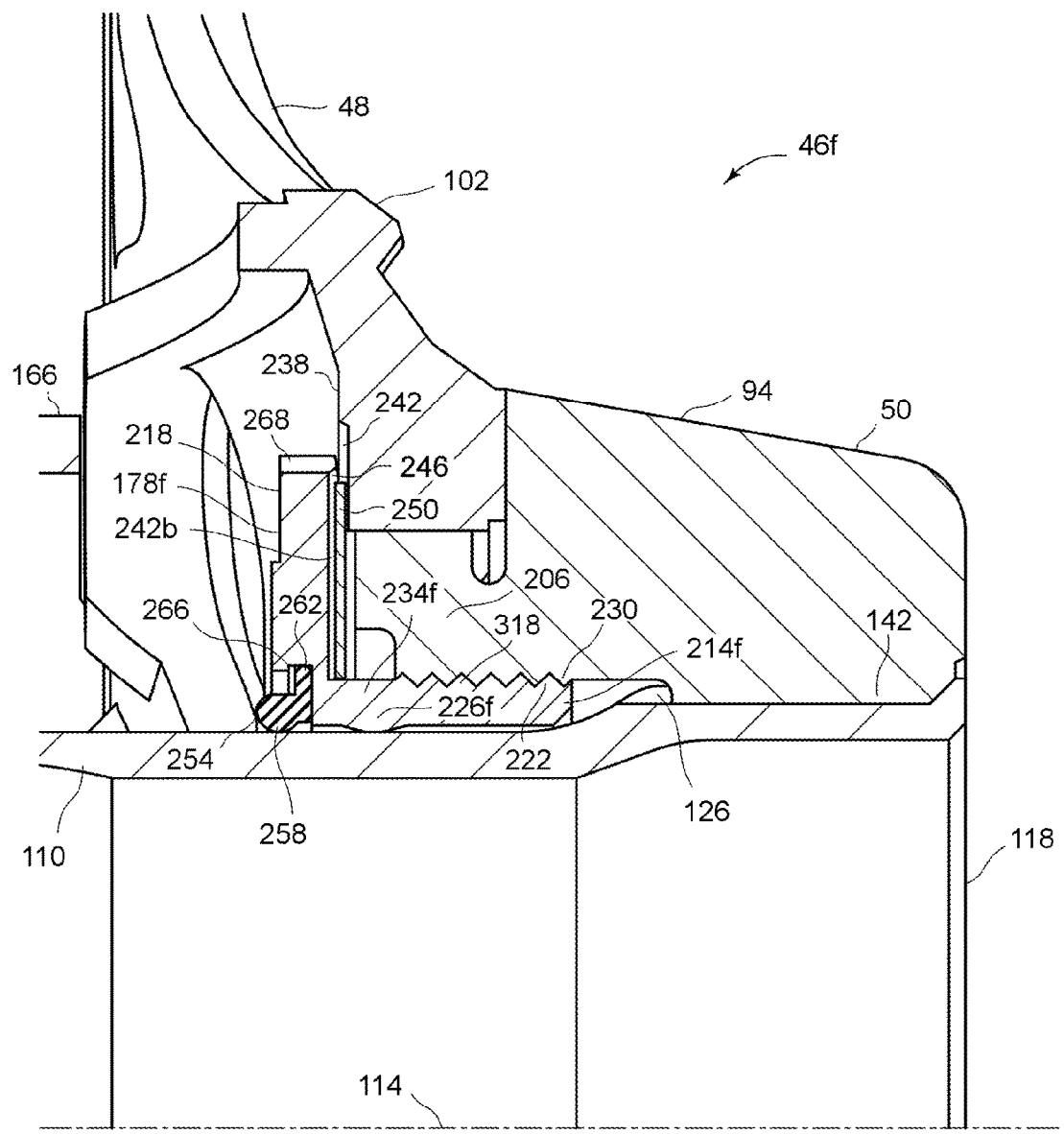
FIG. 17 is a partial cross-sectional view of a further embodiment of the crank assembly of FIG. 2.

In the alternate bicycle crank assembly 46f of FIG. 17, the fixing member 178f includes the base portion 214f and the contact part 226f. However, the base portion 214f and the contact part 226f are integrally formed with each other as a unitary, one-piece member 318. Thus, the contact part 226f can be made of metallic material that is the same as that of the base portion 214f.

Figure 18:
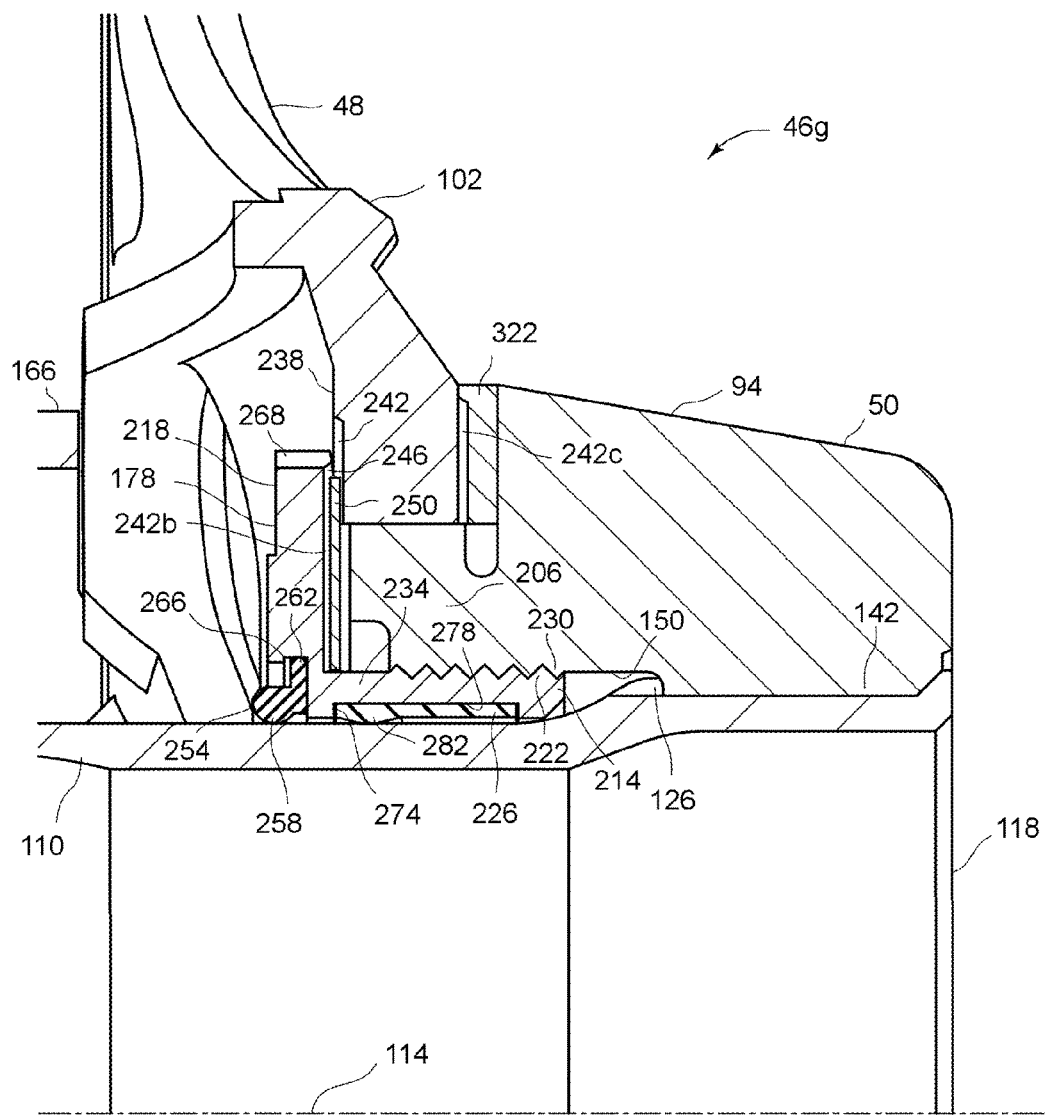
FIG. 18 is a partial cross-sectional view of a further embodiment of the crank assembly of FIG. 2.
Figure 19:
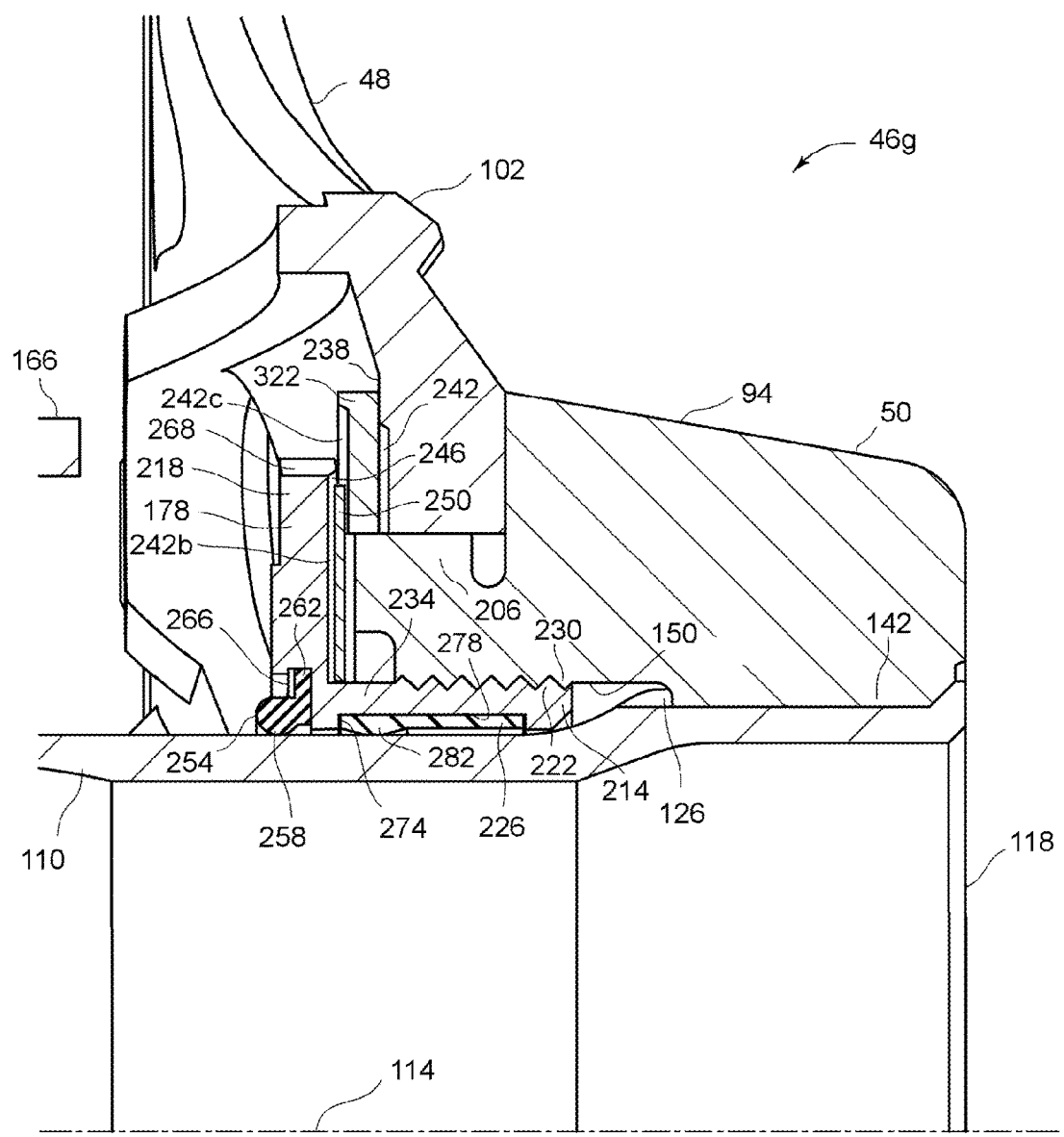
FIG. 19 is a partial cross-sectional view of the embodiment of FIG. 18 in which the sprocket position has been changed.

FIGS. 18 and 19 show a further embodiment of a bicycle crank assembly 46g that includes an adjusting spacer 322 for adjusting the position of the sprocket 48 in the axial direction 120, parallel to the rotational center axis 114. The adjusting spacer 322 has a predetermined thickness as measured in the axial direction 120. In the state of FIG. 18, the adjusting spacer 322 is located on the outside of the sprocket 48, which positions the sprocket 48 in a relatively inward axial position in accordance with the position of the rear sprocket assembly 66 of certain bicycles. In the state of FIG. 19, the adjusting spacer 322 is located on the inside of the sprocket 48, which positions the sprocket 48 in a relatively outward axial position in accordance with the position of the rear sprocket assembly 66 of certain bicycles. By changing relative positions of the adjusting spacer 322 and the sprocket 48 in the axial direction 120, a chain line extending between the sprocket 48 and the rear sprocket assembly 66 can be adjusted in accordance with the rider's requirements. The adjusting spacer 322 has knurling 242c on its inward-facing surface. The knurling 242c can be formed by radially extending teeth like the knurling 242 shown in FIG. 5 on the sprocket body 102. The knurling 242c is formed on only the inward-facing surface of the adjusting spacer 322, and the opposite surface of the adjusting spacer 322 is flat, so that, regardless of whether the adjusting spacer 322 is in the position of FIG. 18 or FIG. 19, there is only one interface in which two knurled surfaces engage one another, which maintains the proper axial locations of the sprocket 48. Except for the addition of the adjustment spacer 322 and changes in the axial dimension of the sprocket body 102 to accommodate the adjusting spacer 322, the embodiment of FIGS. 18 and 19 is essentially the same as that of FIG. 6. Referring to FIG. 18, a washer 250 can be provided between the sprocket 48 and the fixing member 178 to protect the knurling 242 from damage. Likewise, in FIG. 19, a washer 250 can be provided between the adjusting spacer 322 and the fixing member 178.

Figure 20:
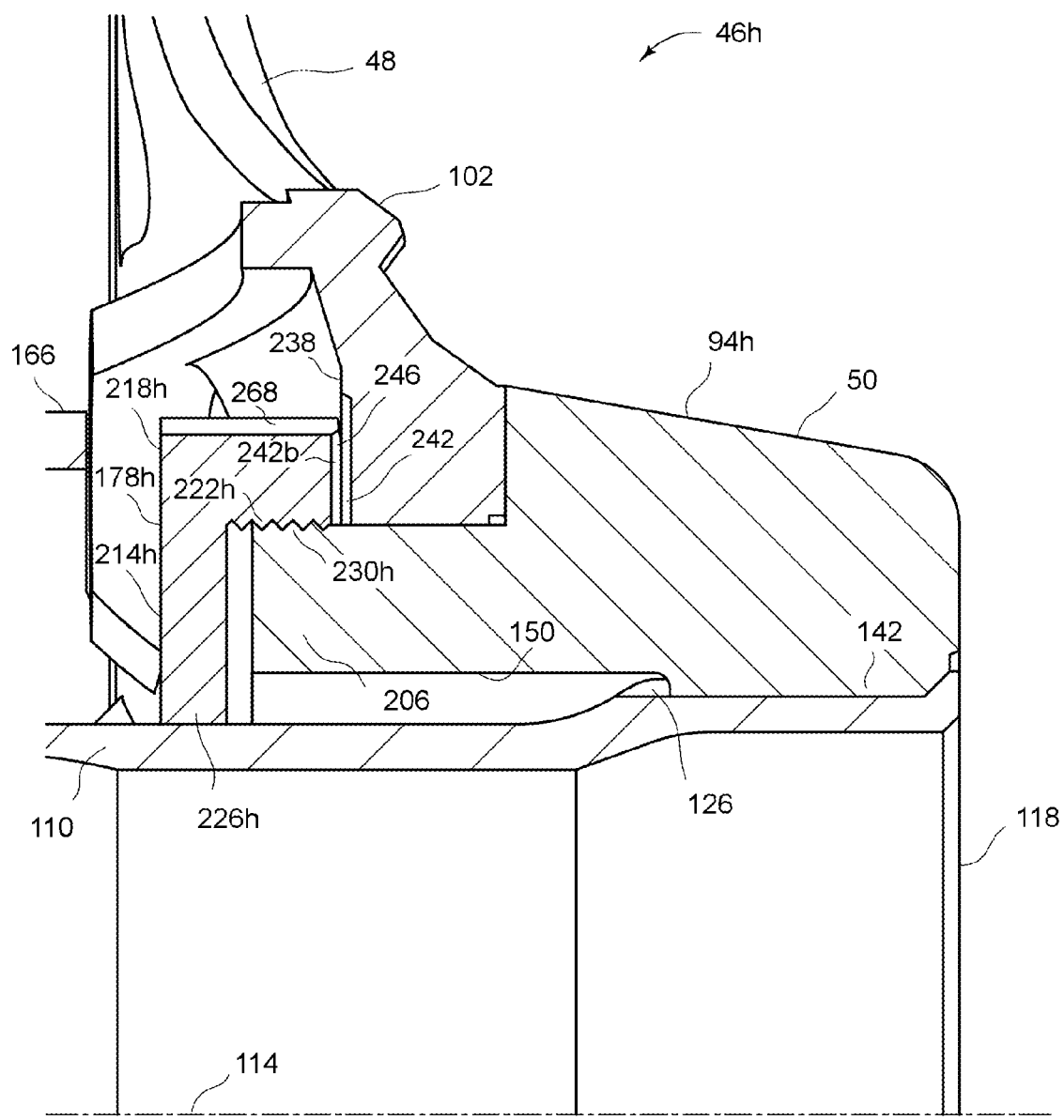
FIG. 20 is a partial cross-sectional view of a further embodiment of the crank assembly of FIG. 2.
Figure 21:
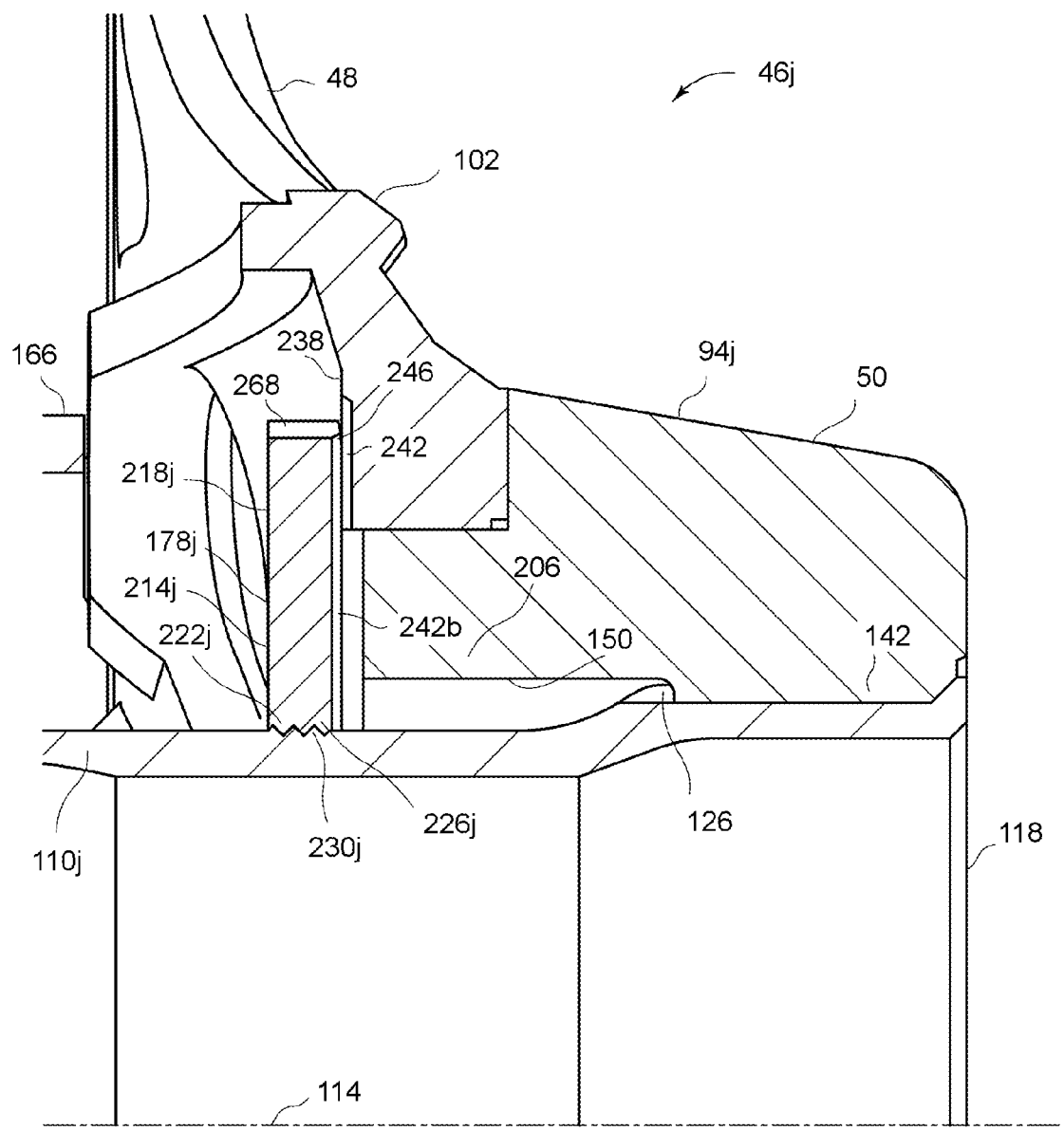
FIG. 21 is a partial cross-sectional view of a further embodiment of the crank assembly of FIG. 2.

FIGS. 20 and 21 show two further embodiments in which the shape of the fixing member 178h, 178j differs from that of the previous embodiments. In the bicycle crank assembly 46h of FIG. 20, the fixing member 178h has an inverted-L shape in cross-section when viewed in a cross-sectional half-plane that includes the rotational center axis 114. The fixing member 178h has a base portion 214h, which is cylindrical and extends in the radial direction between the crank axle 110 and a projection 218h. The projection 218h, which extends axially toward the sprocket body 102 and is tubular in this embodiment, is formed on an outer periphery of the base portion 214h. A first thread 222h is formed in an inner surface of the projection 218h. In the bicycle crank assembly 46h of FIG. 20, a second thread 230h is formed on an outer peripheral surface of the crank-axle-mounting portion 94h (i.e., the mounting boss 206). A contact part 226h is formed on the inner surface of the base portion 214h. The contact part 226h contacts an outer surface of the crank axle 110 when the first thread 222h is engaged with the second thread 230h. The tool-engagement profile 268 is formed on the outer peripheral surface of the fixing member 178h. As in the embodiment of FIG. 14, the crank axle 110 of FIG. 20 can have a tapered surface 298. Further, knurling 242 can be formed on a sprocket-facing surface 246 of the projection 218h and on a corresponding projection-facing surface 238 of the sprocket body 102. Although not illustrated, a washer can be provided between the sprocket body 102 and the fixing member 178h. Although not illustrated, the bicycle crank assembly 46h of FIG. 20 can incorporate a seal member, like that shown in FIG. 6, near the inner periphery of the base portion 214h. Further, the contact part 226h of FIG. 20 can be formed by a flexible strip 227 fitted in a recess 274 as in the embodiment of FIGS. 6 and 13.

In the bicycle crank assembly 46j of FIG. 21, the fixing member 178j is generally disk-shaped. The fixing member 178j has a projection 218j and a base portion 214j. A contact part 226j is formed at an inner periphery of the base portion 214j. The first thread 222j is formed on the contact part 226j. The second thread 230j is formed on an outer surface of the crank axle 110j. The contact part 226j contacts an outer surface of the crank axle 110j when the first thread 222j is engaged with the second thread 230j. Knurling 242 can be formed on the sprocket-facing surface 246 of the projection 218j and on the projection-facing surface 238 of the sprocket 48. The tool-engagement profile 268 can be formed on the outer peripheral surface of the fixing member 178j. Although not illustrated, a washer can be provided between the sprocket body 102 and the fixing member 178j. Further, although not illustrated, the bicycle crank assembly 46j of FIG. 21 can incorporate a seal member, like that shown in FIG. 6, near the inner periphery of the base portion 214j.

While the invention has been described in detail with respect to specific embodiments, those skilled in the art, upon attaining an understanding of the specific embodiments, may readily conceive of alterations, variations, and equivalents to these embodiments. Accordingly, the scope of the invention should be assessed as that of the appended claims and their equivalents.

What is claimed is:
1. A bicycle crank assembly comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly, the projection is configured to prevent the sprocket from moving relative to the crank axle in an axial direction parallel to the rotational center axis, the fixing member includes a contact part provided on an inner periphery of the base portion, and the contact part is configured to contact the crank axle in a state where the first thread of the fixing member is engaged with a second thread provided on the crank arm.

2. The bicycle crank assembly according to claim 1, wherein the base portion has an annular shape.

3. The bicycle crank assembly according to claim 2, wherein the base portion has a tubular shape.

4. The bicycle crank assembly according to claim 1, wherein the second thread is formed on the crank-axle mounting portion.

5. The bicycle crank assembly according to claim 1, wherein the base portion has a tubular shape, and the base portion is configured to be partly disposed between the crank-axle mounting portion of the crank arm and the crank axle in a radial direction with respect to the rotational center axis in a state where the first thread is engaged with the second thread.

6. The bicycle crank assembly according to claim 1, wherein the projection extends about the outer periphery of the base portion in a circumferential direction with respect to the rotational center axis.

7. The bicycle crank assembly according to claim 6, wherein the projection extends completely around the outer periphery of the base portion in the circumferential direction with respect to the rotational center axis.

8. The bicycle crank assembly according to claim 1, wherein the sprocket body has a first torque-transmitting profile; and the crank-axle-mounting portion has a second torque-transmitting profile that is configured to engage with the first torque-transmitting profile.

9. The bicycle crank assembly according to claim 8, wherein the first torque transmitting profile includes a plurality of inner splines; and the second torque transmitting profile includes a plurality of outer splines.

10. The bicycle crank assembly according to claim 1, wherein the projection has a sprocket-facing surface on which knurling is formed.

11. The bicycle crank assembly according to claim 10, wherein the sprocket body has a projection-facing surface on which knurling is formed.

12. The bicycle crank assembly according to claim 1, further comprising a washer configured to be located between the sprocket body and the projection in the axial direction.

13. The bicycle crank assembly according to claim 1, further comprising a seal member configured to be located between the fixing member and the crank axle in a radial direction with respect to the rotational center axis.

14. The bicycle crank assembly according to claim 13, wherein the seal member has a proximal end and a distal end;

the distal end is fixed to the fixing member; and the proximal end contacts the crank axle.

15. The bicycle crank assembly according to claim 1, wherein the crank axle has a first end and a second end;

the second end is opposite to the first end in the axial direction parallel to the rotational center axis of the bicycle crank assembly; and a plurality of first splines is provided on the first end and a plurality of second splines is provided on the second end.

16. The bicycle crank assembly according to claim 15, wherein the crank axle has an intermediate portion between the first end and the second end in the axial direction; and the first splines extend further in a radial direction than an outer peripheral surface of the intermediate portion.

17. The bicycle crank assembly according to claim 16, wherein the crank axle is attached to the crank-axle-mounting portion of the crank arm in a press-fitted manner.

18. The bicycle crank assembly according to claim 16, wherein the crank axle is attached to the crank-axle-mounting portion of the crank arm by an adhesive.

19. The bicycle crank assembly according to claim 15, wherein the crank axle has an intermediate portion between the first end and the second end in the axial direction; and an outer peripheral surface of the intermediate portion is flush with or disposed radially outwardly from the plurality of second splines.

20. The bicycle crank assembly according to claim 1, wherein the fixing member has a tool-engagement profile.

21. The bicycle crank assembly according to claim 20, wherein the tool-engagement profile is formed on a radially outer surface of the projection.

22. The bicycle crank assembly according to claim 1, wherein the contact part is a separate member from the base portion.

23. The bicycle crank assembly according to claim 22, wherein the contact part is made of a non-metallic material.

24. The bicycle crank assembly according to claim 22, wherein the contact part is at least partly annular.

25. The bicycle crank assembly according to claim 1, wherein the base portion and the contact part are integrally formed with each other as a unitary, one-piece member.

26. The bicycle crank assembly according to claim 1, wherein the contact part has an axially inner end and an axially outer end;

the crank axle has a tapered surface that is configured to contact the contact part of the fixing member in a state where the first thread is engaged with the second thread; and the tapered surface is inclined so that a diameter of the crank axle increases from the axially inner end toward the axially outer end.

27. The bicycle crank assembly according to claim 26, wherein an angle defined between the tapered surface and the rotational center axis is equal to or smaller than two degrees.

28. The bicycle crank assembly according to claim 1, wherein the crank axle includes an additional contact part that is a separate member from the crank axle; and the additional contact part is configured to contact the contact part of the fixing member in a state where the first thread of the fixing member is engaged with the second thread.

29. The bicycle crank assembly according to claim 28, wherein the additional contact part is made of a non-metallic material.

30. A bicycle crank assembly, comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly,
the projection is configured to prevent the sprocket from moving relative to the crank axle in an axial direction parallel to the rotational center axis,
the fixing member includes a contact part provided on an inner periphery of the base portion,
the contact part is configured to contact the crank axle in a state where the first thread of the fixing member is engaged with a second thread provided on one of the crank arm and the crank axle,
the first thread is provided on the outer periphery of the base portion; and
the second thread is provided on the crank-axle mounting portion of the crank arm.

31. A bicycle crank assembly, comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly,
the projection is configured to prevent the sprocket from moving relative to the crank axle in an axial direction parallel to the rotational center axis,
the fixing member includes a contact part provided on an inner periphery of the base portion,
the contact part is configured to contact the crank axle in a state where the first thread of the fixing member is engaged with a second thread provided on one of the crank arm and the crank axle,
the contact part is a separate member from the base portion,
the contact part is at least partly annular, and
the contact part has a slit extending in a radial direction with respect to the rotational center axis.

32. A bicycle crank assembly, comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly,
the projection is configured to prevent the sprocket from moving relative to the crank axle in an axial direction parallel to the rotational center axis,
the fixing member includes a contact part provided on an inner periphery of the base portion,
the contact part is configured to contact the crank axle in a state where the first thread of the fixing member is engaged with a second thread provided on one of the crank arm and the crank axle,
the contact part is a separate member from the base portion, and
the base portion has a recess into which the contact part is at least partly located.

33. The bicycle crank assembly according to claim 32, wherein the recess includes a groove extending in a circumferential direction with respect to the rotational center axis.

34. A bicycle crank assembly, comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly,
the projection is configured to prevent the sprocket from moving relative to the crank axle in an axial direction parallel to the rotational center axis,
the fixing member includes a contact part provided on an inner periphery of the base portion,
the contact part is configured to contact the crank axle in a state where the first thread of the fixing member is engaged with a second thread provided on one of the crank arm and the crank axle,
the contact part is a separate member from the base portion, and
the contact part is elastomeric.

35. A bicycle crank assembly, comprising:
a crank arm including a crank-axle-mounting portion;
a sprocket including a sprocket body and a plurality of sprocket teeth provided on an outer periphery of the sprocket body;
a crank axle; and
a fixing member including a base portion, a projection and a first thread, wherein
the projection extends radially outwardly from an outer periphery of the base portion with respect to a rotational center axis of the bicycle crank assembly,
the projection is configured to prevent the sprocket from moving relative to the crank axle in an axial direction parallel to the rotational center axis,
the fixing member includes a contact part provided on an inner periphery of the base portion,
the contact part is configured to contact the crank axle in a state where the first thread of the fixing member is engaged with a second thread provided on one of the crank arm and the crank axle, and
the contact part includes a protuberance extending radially inwardly from the inner periphery of the base portion.

36. The bicycle crank assembly according to claim 35, wherein the protuberance extends radially inwardly from the inner periphery of the base portion by a distance that is equal to or smaller than 0.2 mm.

37. A bicycle crank assembly comprising:
a crank arm including a crank-axle-mounting portion;
a sprocket including a sprocket body and a plurality of sprocket teeth provided on an outer periphery of the sprocket body;
a crank axle; and
a fixing member including a tubular portion and a projection extending radially outwardly from an outer periphery of the tubular portion with respect to a rotational center axis, wherein the tubular portion has a first thread that is configured to engage with a second thread provided on the crank-axle mounting portion of the crank arm, the first thread is formed on the outer periphery of the tubular portion, the projection is configured to prevent the sprocket from moving relative to the crank axle in an axial direction parallel to the rotational center axis, and the fixing member has a tool-engagement profile formed on a radially outer surface of the projection.

38. A bicycle crank assembly, comprising:

a crank arm including a crank-axle-mounting portion;

a sprocket including a sprocket body and a plurality of sprocket teeth provided on an outer periphery of the sprocket body;

a crank axle;

a fixing member including a base portion and a projection, wherein the projection extends radially outwardly from an outer periphery of the base portion with respect to a rotational center axis, and the base portion has a first thread configured to engage with a second thread provided on one of the crank arm and the crank axle; and a seal member configured to be located between the fixing member and the crank axle 0 in a radial direction with respect to the rotational center axis, wherein the projection is configured to prevent the sprocket from moving relative to the crank axle in an axial direction parallel to the rotational center axis.

39. The bicycle crank assembly according to claim 38, wherein the seal member has a proximal end and a distal end;

the proximal end is fixed to the fixing member; and the distal end contacts a bottom bracket assembly.

40. The bicycle crank assembly according to claim 38, wherein the seal member has a proximal end and a distal end;

the distal end is fixed to the fixing member; and the proximal end contacts the crank axle.

* * * * *